(12) United States Patent
Okada et al.

(10) Patent No.: US 7,487,994 B2
(45) Date of Patent: Feb. 10, 2009

(54) AIRBAG DEVICE FOR FRONT PASSENGER'S SEAT

(75) Inventors: Yasushi Okada, Aichi-ken (JP); Masako Asai, Aichi-ken (JP)

(73) Assignee: Toyoda Gosei Co., Ltd., Aichi-pref (JP)

( * ) Notice: Subject to any disclaimer, the term of this patent is extended or adjusted under 35 U.S.C. 154(b) by 413 days.

(21) Appl. No.: 11/045,629

(22) Filed: Jan. 25, 2005

(65) Prior Publication Data
US 2005/0167958 A1 Aug. 4, 2005

(30) Foreign Application Priority Data
Feb. 2, 2004 (JP) ............... 2004-025514
Sep. 16, 2004 (JP) ............... 2004-270066

(51) Int. Cl.
*B60R 21/237* (2006.01)
*B60R 21/205* (2006.01)

(52) U.S. Cl. ............... 280/732; 280/728.2; 280/743.1; 280/728.3

(58) Field of Classification Search ............ 280/728.3, 280/732, 728.1, 728.2, 731, 743.1
See application file for complete search history.

(56) References Cited

U.S. PATENT DOCUMENTS

| | | | | |
|---|---|---|---|---|
| 5,478,113 | A * | 12/1995 | Rogers | 280/743.1 |
| 5,979,937 | A * | 11/1999 | Yoshida et al. | 280/743.2 |
| 6,176,509 | B1 * | 1/2001 | Kawaguchi et al. | 280/728.1 |
| 6,196,585 | B1 * | 3/2001 | Igawa | 280/743.1 |
| 6,247,727 | B1 * | 6/2001 | Hamada et al. | 280/743.2 |
| 6,352,284 | B1 * | 3/2002 | Okada et al. | 280/743.1 |
| 6,390,500 | B1 * | 5/2002 | Yamada et al. | 280/743.1 |
| 6,398,258 | B2 * | 6/2002 | Hamada et al. | 280/743.1 |
| 6,406,061 | B1 * | 6/2002 | Nishijima et al. | 280/743.1 |
| 6,520,901 | B2 * | 2/2003 | Nishijima et al. | 493/451 |
| 6,557,891 | B2 * | 5/2003 | Okada et al. | 280/743.1 |
| 6,832,779 | B2 * | 12/2004 | Tajima et al. | 280/743.1 |
| 6,835,439 | B1 * | 12/2004 | Kondo et al. | 428/156 |
| 6,991,253 | B2 * | 1/2006 | Webber | 280/728.3 |
| 7,066,490 | B2 * | 6/2006 | Yamamoto et al. | 280/743.2 |
| 7,156,414 | B2 * | 1/2007 | Hayashi et al. | 280/728.3 |
| 2001/0007391 | A1 * | 7/2001 | Hamada et al. | 280/743.2 |

(Continued)

FOREIGN PATENT DOCUMENTS

JP    A-2002-255004    9/2002

*Primary Examiner*—John Q. Nguyen
*Assistant Examiner*—Timothy Wilhelm
(74) *Attorney, Agent, or Firm*—Posz Law Group, PLC

(57) ABSTRACT

In the airbag device for front passenger's seat of the present invention, an airbag before being housed in the case and mounted on vehicle is folded up through a preparatory folding step and a regular folding step, the regular folding step further including a transverse folding step and a vertical folding step. In a preparatorily folding step, a portion near an upper edge of the passenger's side wall is located to confront the gas inlet port, and the passenger's side wall is flatly developed so as to overlap with a lower part of the circumferential wall. In the transverse folding step, a portion of the preparatorily folded airbag located rearward of the gas inlet port is folded back in two toward a lower side of a lower part of the circumferential wall to bring a rear end thereof closer to the gas inlet port. The airbag device of the present invention shifts an entire rear face of the deploying airbag rearward in a generally vertical condition.

10 Claims, 36 Drawing Sheets

U.S. PATENT DOCUMENTS

| | | | |
|---|---|---|---|
| 2001/0011816 A1* | 8/2001 | Suzuki et al. | 280/732 |
| 2001/0028165 A1* | 10/2001 | Nishijima et al. | 280/743.1 |
| 2002/0000711 A1* | 1/2002 | Schmidt et al. | 280/728.3 |
| 2002/0052284 A1* | 5/2002 | Nishijima et al. | 493/449 |
| 2002/0053791 A1* | 5/2002 | Nishijima et al. | 280/743.1 |
| 2002/0195799 A1* | 12/2002 | Simon et al. | 280/728.3 |
| 2004/0207181 A1* | 10/2004 | Hayashi et al. | 280/728.3 |
| 2005/0087964 A1* | 4/2005 | Min | 280/728.3 |
| 2005/0104338 A1* | 5/2005 | Soderquist | 280/728.3 |

* cited by examiner

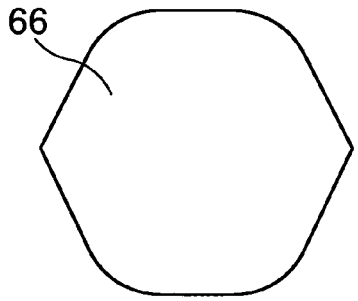

⇩

AIRBAG DEVICE FOR FRONT PASSENGER'S SEAT

The present application claims priorities from Japanese Patent Application No. 2004-025514 of Okada et al., filed on Feb. 2, 2004, and Japanese Patent Application No. 2004-270066 of Okada et al., filed on Sep. 16, 2004, the disclosures of which are hereby incorporated into the present application by reference.

BACKGROUND OF THE INVENTION

1. Field of the Invention

The present invention relates to an airbag device for front passenger's seat to be mounted on an instrument panel in front of front passenger's seat.

2. Description of Related Art

In the prior art, Japanese Patent Laid-Open No.2002-255004 discloses an airbag device for front passenger's seat including an airbag folded and housed in a case. When fed with inflation gas, the airbag pushes and opens a door portion in an airbag cover arranged on top face of instrument panel, and protrudes upward and deploys rearward of vehicle.

As a shape as completely deployed, the airbag of this airbag device includes a passenger's side wall arranged generally vertically to confront a passenger, and a circumferential wall extending from outer edge of the passenger's side wall and narrowing generally conically as it goes forward. Moreover, the airbag is provided in lower front part of the circumferential wall at complete inflation with a gas inlet port arranged generally horizontally, and is attached to the case at periphery of the gas inlet port.

Before being housed in the case, the airbag is folded through preparatory folding step and regular folding step, the regular folding step further consisting of transverse folding step to fold the airbag on transverse folds and reduce a dimension in front-rear direction, and vertical folding step to fold the airbag on folds along front-rear direction to reduce a transverse width.

In a preparatorily folded state, a portion near an upper edge of the passenger's side wall is located to confront the gas inlet port, and the passenger's side wall is flatly developed so as to overlap with a lower part of the circumferential wall.

In this airbag device for front passenger's seat, the airbag admits inflation gas from the gas inlet port and deploys while unfolding the transverse and vertical folds. At this time, since the portion near the upper edge of the passenger's side wall is disposed in a position to confront the gas inlet port in the preparatory folding step, the portion is pushed up intensely by a pressure of inflation gas having just flown-in prior to other portions of the passenger's side wall such as lower part. Consequently, the passenger's side wall is easily disposed generally vertically.

Moreover, quick lifting up of the portion near the upper edge of the passenger's side wall contributes to quick unfolding of the transverse and vertical folds, and further contributes to quick deployment of the passenger's side wall.

Therefore, upon airbag deployment, the airbag device for front passenger's seat in the prior art arranges the passenger's side wall, which is generally perpendicular to a gas inlet port vicinity, in a generally vertical condition, and develops the airbag in a fully open state so as not to apply partial pressure to a passenger.

However, the airbag device for front passenger's seat in the prior art still has a room for improvement in moving an upper part of rear face of the airbag further quicker than a lower part. That is, if the upper part of the rear face of the airbag moves rearward quicker than the lower part during airbag deployment, an entire rear face of the deploying airbag further easily takes a vertical position in moving rearward. Even if the deploying airbag engages an advancing passenger, the airbag protects the passenger properly without applying partial pressure to the passenger.

SUMMARY OF THE INVENTION

The present invention contemplates to solve the above-mentioned problem, and has an object to provide an airbag device for front passenger's seat capable of shifting the entire rear face of the deploying airbag rearward in a generally vertical condition.

The airbag device of the present invention includes an airbag deployable up and rearward from top face of instrument panel for protecting a passenger when fed with inflation gas. The airbag device further includes a case for housing the folded airbag, and an airbag cover arranged in top face of the instrument panel and including a door pushed and opened by the airbag when the airbag deploys therefrom. The airbag includes a passenger's side wall and a circumferential wall extending from outer edge of the passenger's side wall, and when the airbag is deployed, the passenger's side wall is arranged generally vertically to confront a passenger, and the circumferential wall narrows in a generally conical shape toward vehicle's front part. The airbag includes a gas inlet port in a lower front part of the circumferential wall as deployed, the inlet port being arranged generally horizontally, and is attached to the case at periphery of the gas inlet port. Before being housed in the case and mounted on vehicle, the airbag is folded through a preparatory folding step and a regular folding step, the regular folding step further including a transverse folding step to fold the airbag on transverse folds to reduce longitudinal length, and a vertical folding step to fold the airbag on longitudinal folds to reduce transverse width. In a preparatorily folded state, a portion near an upper edge of the passenger's side wall is located in a position to confront the gas inlet port, and the passenger's side wall is flatly developed so as to overlap with a lower part of the circumferential wall. In the transverse folding step, a portion of the preparatorily folded airbag located rearward of the gas inlet port is folded back toward a lower side of the lower part of the circumferential wall to bring a rear end thereof closer to the gas inlet port, whereby a folded-back portion overlaps with a remainder of the rear portion of the gas inlet port.

In the airbag device for front passenger's seat of the present invention, the airbag admits inflation gas from the gas inlet port and deploys in a generally reverse manner to the folding process, i.e., while unfolding the transverse and vertical folds in the regular folding process and folds in the preparatory folding process.

In the preparatory folding step, the portion near the upper edge of the passenger's side wall is disposed in a position to confront the gas inlet port, and the passenger's side wall is flatly developed so as to overlap with a lower part of the circumferential wall. Accordingly, the upper edge vicinity portion is pushed up intensely by a pressure of inflation gas having just flown-in prior to other portions of the passenger's side wall, such as a lower part, so that the passenger's side wall is easily disposed generally vertically.

In the lower part of the passenger's sidewall, especially, the portion folded back toward the inlet port in the transverse folding step unfolds and is developed while sliding on surrounding members. Accordingly, the passenger's side wall confronting a passenger is prevented from projecting toward the passenger in the lower part. That is, the folded-back portion of the airbag or the lower part of the passenger's side wall is prevented from popping out of the case, and while the folded-back portion is held, an upper part of the airbag projecting toward the passenger is charged with more inflation gas and more inflated than a lower part of the airbag. Consequently, the upper part of the airbag is easily disposed generally right above the lower part of the airbag, which helps shift an entire rear face of the airbag rearward and toward the passenger in a generally vertical condition.

Therefore, the airbag device for front passenger's seat of the present invention shifts the entire rear face of the deploying airbag rearward in a generally vertical condition, and protects a passenger properly without applying partial pressure to the passenger even if the deploying airbag engages the advancing passenger.

In the above airbag, it is desired that a leading end of the folded-back portion is located within a range from the gas inlet port to a hinge portion of the door of the airbag cover in inner surface of a rear part of the case.

With this construction, when the folded-back portion unfolds during deployment, a portion near the inlet port in the lower side of the circumferential wall in upper extension of the folded-back portion is inflated and presses the folded-back portion onto inner surface of the case or the airbag cover, which delays development of the folded-back portion even more, and helps shift the passenger's side wall rearward in a generally vertical condition.

If a resistance increasing means is arranged at least either in portions on which the folded-back portion slides during development, or in the folded-back portion itself, the resistance increasing means further delays unfolding of the folded-back portion. Consequently, the passenger's side wall further shifts rearward in a generally vertical condition.

The resistance increasing means may be constructed of a concavo-convex portion arranged in portions of the airbag cover on which the folded-back portion slides, or by a coating layer of silicone rubber or the like arranged in the folded-back portion for increasing friction resistance.

Alternatively, the resistance increasing means may be constructed by a belt portion formed in the vicinity of the gas inlet port for holding the folded-back portion onto a lower side of the lower part of the circumferential wall. With this construction, sliding resistance is applied to the folded-back portion passing through the belt portion, and suppresses unfolding of the folded-back portion. If a leading end of the folded-back portion is further folded back over the belt portion, sliding resistance is even more increased and suppresses unfolding of the folded-back portion.

If a reinforcing cloth is joined to a lower surface of the lower part of the circumferential wall, the belt portion may be constructed by a portion between two slits formed in the reinforcing cloth for inserting the folded-back portion thereinto. Alternatively, the belt portion may be constructed by joining a belt-shaped member to the lower surface of the lower part of the circumferential wall with left and right ends of the member folded back toward transverse center. With this construction, an opening into which the folded-back portion is set in can be enlarged in comparison with a case where the belt portion is constructed by abovementioned slits, so that the folded-back portion is inserted into the belt portion without causing wrinkles. Without wrinkles, the completely folded airbag is prevented from becoming bulky.

If the airbag cover includes a door which opens rearward around a hinge portion located in its rear part upon airbag deployment, and a joint wall located around the door for attachment to the case, it will be appreciated that the airbag cover further includes a ceiling wall that is projected forward from a rear part of the joint wall and has the hinge portion of the door at its front end. This ceiling wall constitutes the resistance increasing means that applies sliding resistance to the folded-back portion and suppresses its smooth unfolding because the folded-portion is caught by the overhang ceiling wall when unfolding.

In a preparatorily folded airbag, it is desired that a generally entire area of the passenger's side wall is flatly developed while the circumferential portion is folded up. With this construction, the passenger's side wall easily moves toward a passenger in a fully developed state, in comparison with a case where the passenger's side wall is folded-up, and moving speed of the passenger's side wall toward the passenger is even more suppressed.

It is also desired that, in a preparatorily folded airbag, left and right portions of the gas inlet port in the circumferential wall are folded in on valley folds extending along front-rear direction such that generally intermediate portions between the gas inlet port and left and right edges of the flatly developed passenger's side wall are brought closer to the gas inlet port and placed at side of the passenger's side wall in the gas inlet port periphery, and that a portion of the circumferential wall near the upper edge of the passenger's side wall is folded in on a valley fold extending along transverse direction. With this construction, since the circumferential wall is folded up symmetrically relative to the gas inlet port, the preparatory folding is facilitated. Moreover, this folded configuration is easily formed by gripping a generally intermediate portion between a transverse center of front edge vicinity of the gas inlet port in the circumferential wall and a transverse center of the passenger's side wall upper edge, and transverse center portion of a rear side portion of the gas inlet port in the circumferential wall, and by pulling the gripped portions in front and rear directions to separate them from each other. Accordingly, the preparatory folding of the circumferential wall is easily conducted by gripping and pulling predetermined portions in the circumferential portion, which further facilitates the preparatory folding work.

In the transverse folding step, it is further desired that the airbag portion folded back in two in rear of the gas inlet port is roll-folded on the circumferential wall from a fold on which the folded-back portion is folded, and then placed over the vicinity of the gas inlet port. With this folding method, when unrolling, the folded back and overlapped airbag portion is developed along top face of the instrument panel without projecting toward a passenger.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
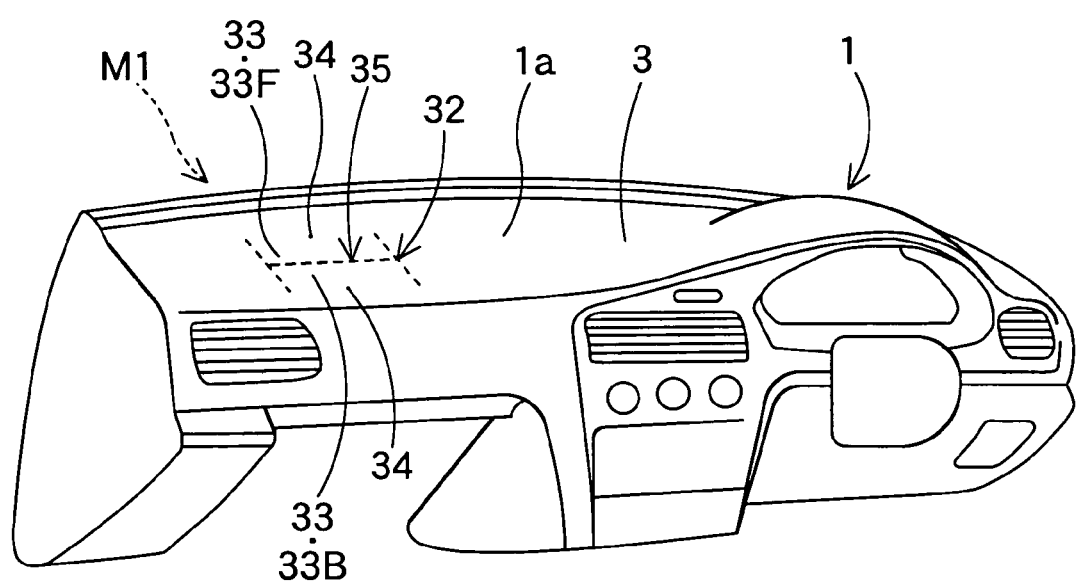
FIG. 1 is a perspective view of an instrument panel on which a first embodiment of an airbag device for front passenger's seat according to the present invention is mounted.
Figure 2:
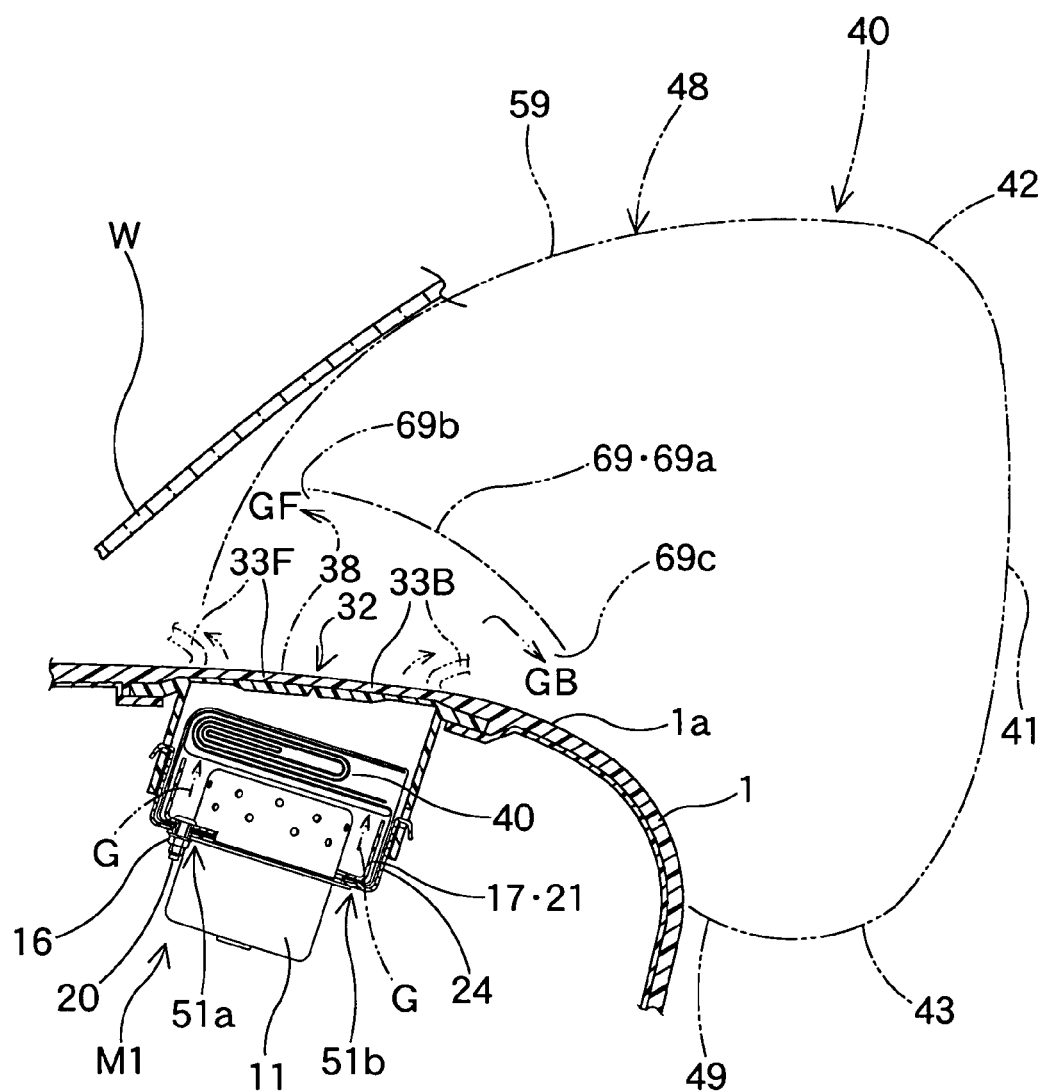
FIG. 2 is a schematic section of the airbag device of FIG. 1 in service, taken along front-rear direction of vehicle.

FIGS. 1 and 2 illustrate a first embodiment of the airbag device for front passenger's seat of the present invention. This airbag device M1 is a top-mount type that is arranged inside top face 1a of dashboard (or instrument panel) 1, and includes a folded airbag 40, an inflator 11 for supplying the airbag 40 with inflation gas, a case 24 for housing and holding the airbag 40 and the inflator 11, a retainer 17 for attaching the airbag 40 to the case 24, and an airbag cover 32 for covering the folded airbag 40.

As shown in FIGS. 1 to 4, the airbag cover 32 is integral with the dashboard 1 in the first embodiment. The dashboard 1 includes a base 2 arranged in back side and a cover layer 3 covering an outer side of the base 2. The base 2 is made from hard synthetic resin such as polypropylene, and the cover layer 3 has a foamed layer of foamable polyurethane or the like, and a skin layer. The airbag cover 32 includes a soft portion 4 made from soft synthetic resin such as thermoplastic elastomer of polyolefin or the like, instead of the base 2. The airbag cover 32 includes two doors 33 (front door 33F and rear door 33B) provided with a thinned breakable portion 35 therearound. As shown in FIG. 1, the breakable portion 35 is arranged in an H-shape as viewed from upper side of the dashboard 1. The two doors 33F and 33B open front and rearwards, respectively, around their front or rear ends as hinges 34.

The airbag cover 32 further includes a joint wall 36 projected downward from the back side in a generally square cylindrical shape to encircle arrangement positions of the doors 33F and 33B. The joint wall 36 are provided with a plurality of retaining holes 37 at predetermined positions of its walls 36a and 36b confronting each other in front-rear direction. Retaining pawls 30 of the case 24 are inserted into the retaining holes 37 so as to retain the joint wall 36.

In the airbag cover 32, moreover, a concavo-convex portion 32a is disposed as a resistance increasing means FM in portions on which a later-described folded-back portion 74 of the airbag 40 slides during deployment, i.e., in a front side 36c of the wall portion 36b in inner surface of the joint wall 36 and in a back surface 33a of the door 33B. The concavo-convex portion 32a includes numbers of convex portions for increasing friction resistance.

In the illustrated embodiment, the soft portion 4 is arranged in back side of the doors 33F and 33B of the airbag cover 32, and in front and rear portions of the joint wall 36 in the vicinity of the hinge lines 34 of the doors 33F and 33B in back side of the dashboard 1. Moreover, the soft portion 4 forms the joint wall 36 itself.

Figure 3:
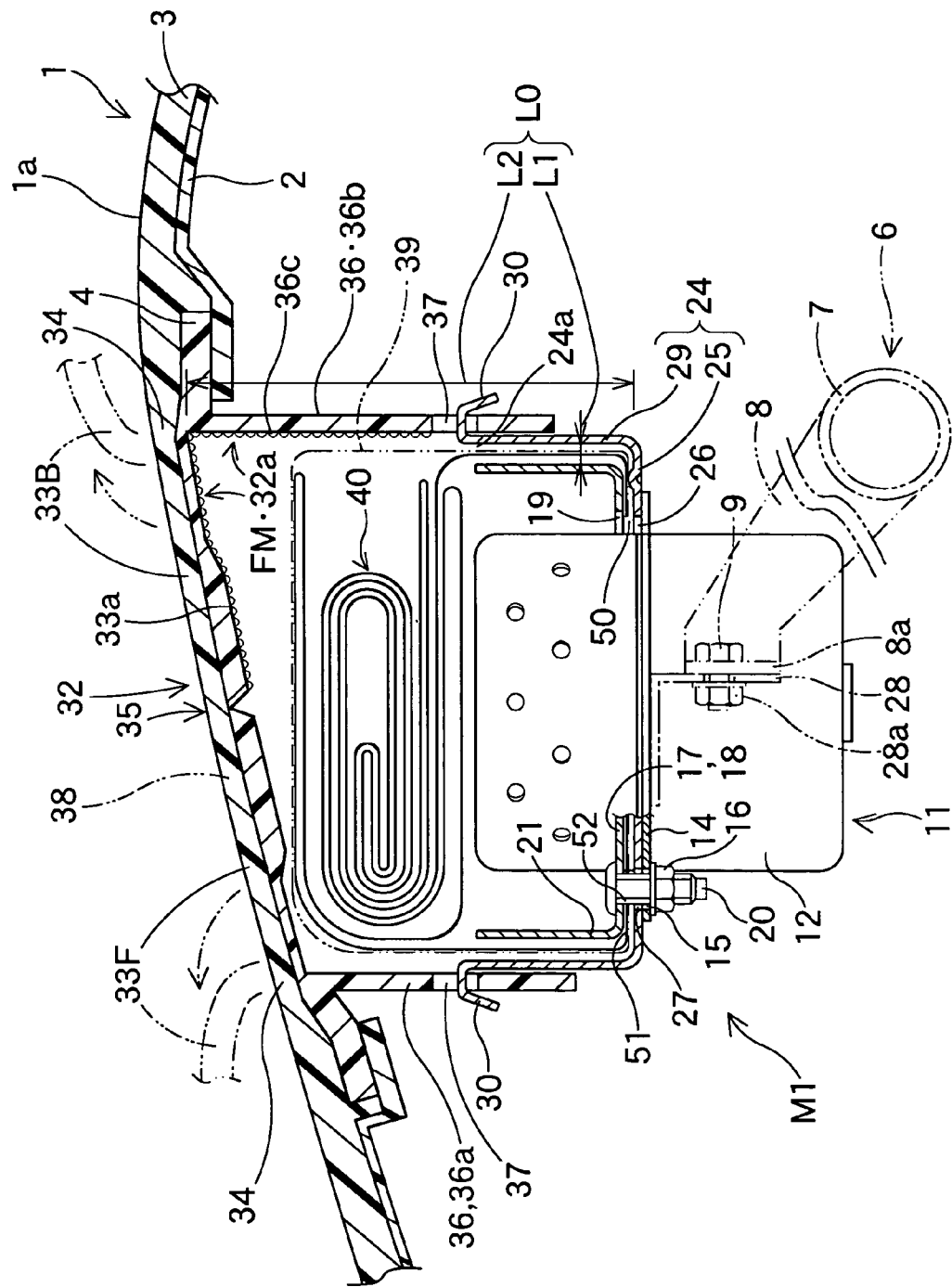
FIG. 3 is a schematic enlarged section of the airbag device of FIG. 1, taken along front-rear direction of vehicle.
Figure 4:
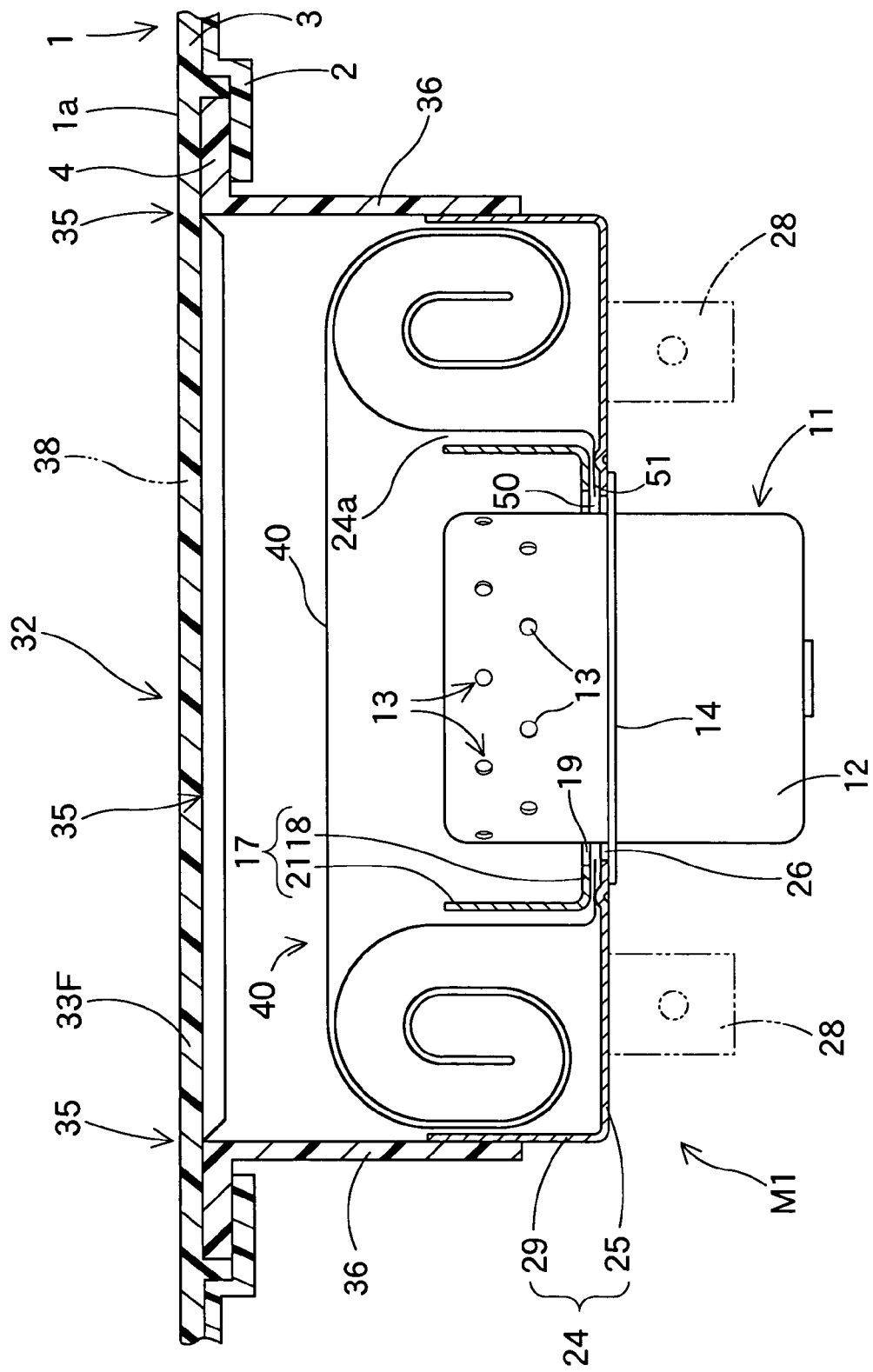
FIG. 4 is a schematic enlarged section of the airbag device of FIG. 1, taken along transverse direction of vehicle.

As shown in FIGS. 2 to 4, the case 24 is made of sheet metal into a generally rectangular parallelpiped shape, and has a rectangular opening 24a at the top. The case 24 includes a bottom wall 25 of a rectangular plate shape, and a side wall 29 extending upward toward the airbag cover 32 from the outer circumferential edge of the bottom wall 25 in a generally square cylindrical shape. The bottom wall 25 has a rectangular plate shape elongated in left-right direction, and has in its center a generally round insert hole 26 for inserting an upper part of the inflator 11 from lower side toward the airbag cover 32. Around the insert hole 26 of the bottom wall 25 are mounting holes 27 for inserting bolts 20 of the retainer 17 therethrough. The bottom wall 25 is further provided at left and right positions in lower surface thereof with brackets 28 for securing the case 24 to vehicle body 6. Each of the brackets 28 is provided with a nut 28a for fastening a bolt 9 thereinto. At side of vehicle body 6 are brackets 8 extending from reinforcement 7. Each of the bolts 9 is inserted through a mounting seat 8a of the bracket 8 and fastened into the nut 28a. By fastening the bolts 9 into the nuts 28a, the case 24, or the airbag device M1 is secured to the body 6.

The side wall 29 of the case 24 is provided at front and rear upper ends thereof with a plurality of retaining pawls 30 turned outward and downward. As described above, the retaining pawls 30 are inserted into the retaining holes 37 of the joint wall 36 of the airbag cover 32 for retaining the joint wall 36.

As shown in FIGS. 2 to 4, the inflator 11 has a disc shape and includes a generally cylindrical body 12 and a flange 14 for attaching the inflator 11 to the case 24. The flange 14 projects from outer circumference of the body 12 in a generally square annular shape (or in a generally square plate shape), and is provided at its four corners with mounting holes 15. Each of the mounting holes 15 is placed in a position corresponding to the mounting hole 27 in the bottom wall 25 of the case 24, and has the same internal diameter as the mounting hole 27.

Outer diameter of the body 12 is slightly smaller than the internal diameter of the insert hole 26 of the bottom wall 25. The body 12 is provided above the flange 14 with a plurality of gas discharge ports 13 for discharging inflation gas.

As shown in FIGS. 2 to 4, the retainer 17 is made of sheet metal, and includes a base 18 and a guide wall 21. The base 18 includes an insert hole 19 opened generally in the same shape as the insert hole 26 of the case 24. The guide wall 21 extends up toward the airbag cover 32 from outer edge of the base 18 in a generally square cylindrical shape.

The base 18 has a generally square outline, and is provided at its four corners with bolts 20 extending downward. When the retainer 17 is arranged within the airbag 40, the individual bolts 20 are inserted through the mounting holes 52 of the airbag 40, the mounting holes 27 of the bottom wall 25 of the case 24, and the mounting holes 15 of the flange 14 of the inflator 11, and are fastened into nuts 16. Thus the airbag 40 and the inflator 11 are attached to the bottom wall 25 of the case 24. In other words, when the bolts 20 are fastened into the nuts 16, periphery 51 of a gas inlet port 50 of the airbag 40 is pressed onto the bottom wall 25 by the base 18, thereby attaching the airbag 40 to the bottom wall 25, while the flange 14 of the inflator 11 is pressed onto periphery of the insert hole 26, thereby attaching the inflator 11 to the bottom wall 25.

Figure 5:
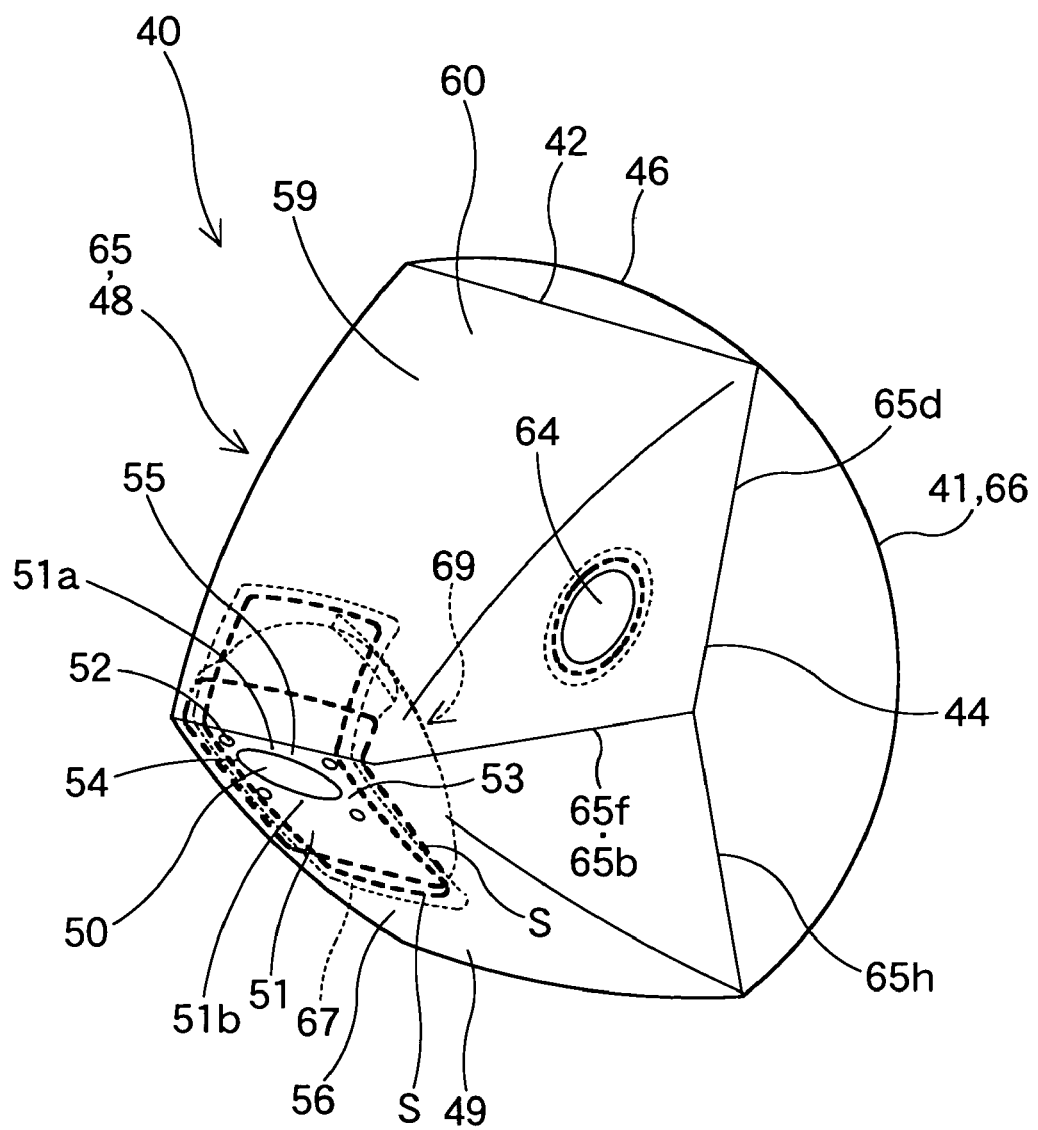
FIG. 5 is a perspective view of an airbag employed in the airbag device of FIG. 1, as inflated by itself.
Figure 6:
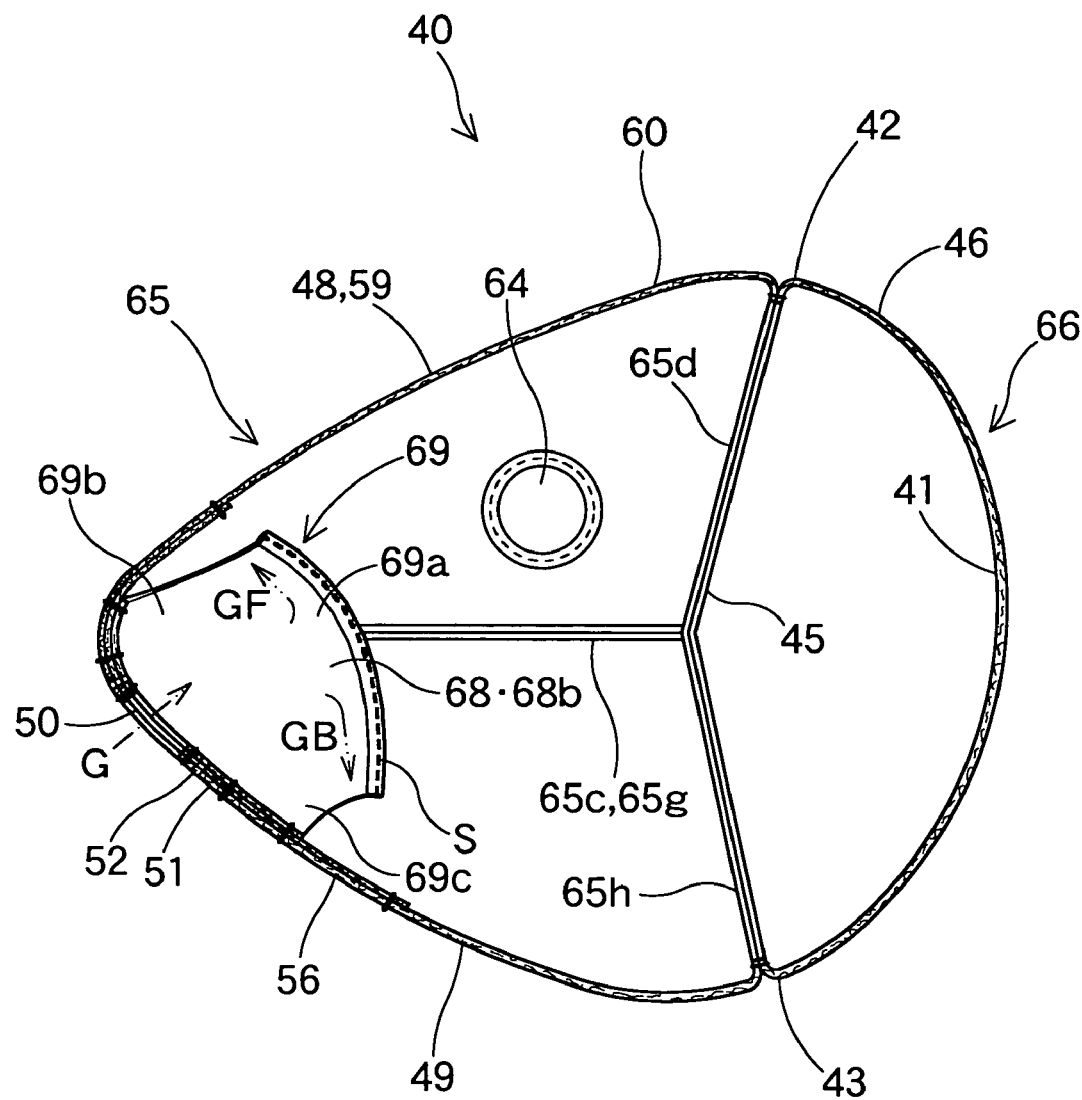
FIG. 6 is a sectional view of the airbag of FIG. 5 as inflated by itself, taken along the front-rear direction.

As shown in FIGS. 5 and 6, the airbag 40 has, as its shape as completely expanded and inflated, a passenger's side wall 41 arranged generally vertically to confront the passenger, and a circumferential wall 48 extending from outer edge of the passenger's side wall 41 while narrowing in a generally conical shape toward vehicle's front part. The airbag 40 includes a round gas inlet port 50 in a front part of a lower wall 49 of the circumferential wall 48, which is to be the lower side when completely deployed, for introducing inflation gas G into the airbag 40 (refer to FIG. 6).

Internally, the airbag 40 includes a flow regulating cloth 69 arranged to cover the gas inlet port 50 for redirecting stream of flowing-in inflation gas G. As shown in FIG. 2, when the airbag 40 is inflated, the vicinity of transverse center 69a and front and rear openings 69b and 69c of the flow regulating cloth 69 are disposed above the top face 1a of the dashboard 1. The flow regulating cloth 69 redirects inflation gas G having flown in the airbag 40 into gas GF flowing out of the front opening 69b and gas GB flowing out of the rear opening 69c. After flowing out of the opening 69b forward, the gas GF flows upward along the circumferential wall 48 of the airbag 40, and then flows rearward.

In the periphery 51 of the gas inlet port 50 are four mounting holes 52. The bolts 20 of the retainer 17 are inserted into the mounting holes 52, so that the airbag 40 is held by the bottom wall 25 of the case 24. In left and right sides of the circumferential wall 48 is each one vent hole 64 to emit extra inflation gas. The airbag 40 is further provided internally near the mounting holes 52 in the gas inlet port 50 periphery with a reinforcing cloth 67 having a generally square annular shape.

When the airbag device M1 is mounted on the vehicle by fixing the airbag 40 to the case bottom wall 25 by the retainer 17, and by securing the case 24 to the body 6, front edge 51a of the opening periphery 51 is positioned at slightly higher level than rear edge 51b, so that an opening face of the gas inlet port 50 is arranged generally horizontally together with the opening periphery 51, as shown in FIG. 2.

Figure 7:
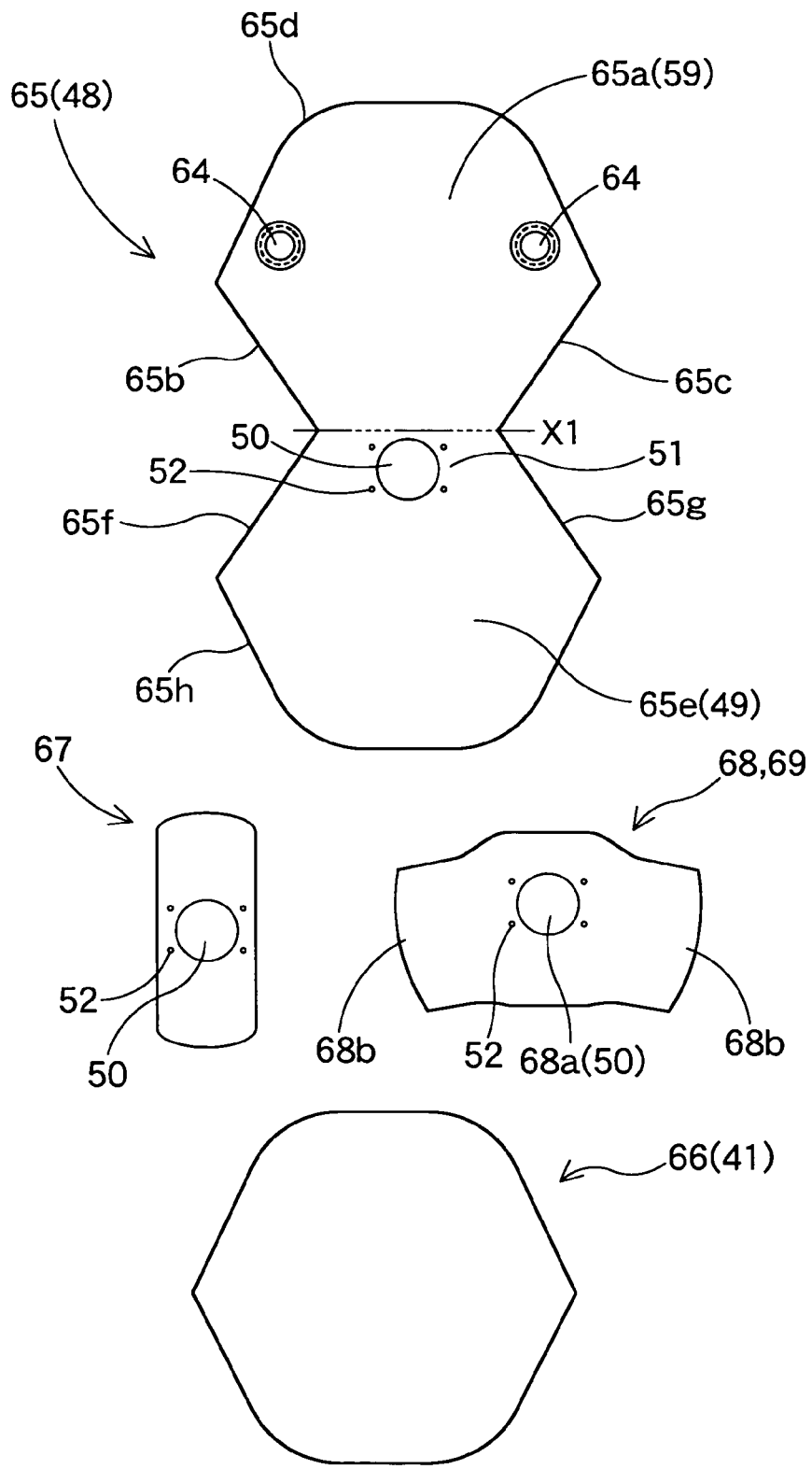
FIG. 7 shows plan views of constituent parts of the airbag of FIG. 5.

As shown in FIGS. 7 and 8, the airbag 40 is formed by sewing up two base cloths, i.e., a first base cloth 65 and a second base cloth 66. The first base cloth 65 is shaped to be a combination of two generally hexagons, i.e., an upper portion 65a and a lower portion 65e, and resultingly has a gourd-shape having left and right edges in longitudinal center recessed. The second base cloth 66 has a generally round shape approximate to a generally hexagonal shape. These planar base cloths 65 and 66 provide a solid airbag 40 by sewing work.

The second base cloth 66 defines a generally entire area of the passenger's side wall 41 of the airbag 40, whereas the first base cloth 65 defines a generally entire area of the circumferential wall 48 of the airbag 40. Moreover, the upper portion 65a of the first base cloth 65 defines a generally entire area of an upper part of the circumferential wall 48, or an upper circumferential wall 59, whereas the lower portion 65e of the first base cloth 65 defines a generally entire area of a lower part of the circumferential wall 48, or the lower circumferential wall 49.

The first and second base cloths 65 and 66, the reinforcing cloth 67 and the flow regulating cloth 69 are formed of woven fabric of polyester, polyamide yarn or the like without silicon coating or the like.

As shown in FIGS. 5 and 6, the flow regulating cloth 69 is larger than longitudinal and transverse dimensions of the gas inlet port 50 so as to cover the gas inlet port 50 within the airbag 40. Its longitudinal section upon deployment of the airbag 40 is arcuate bulging upward away from the gas inlet port 50.

In the first embodiment, as shown in FIG. 7, the flow regulating cloth 69 is prepared as a cloth member 68 before being attached to the airbag 40. The cloth member 68 has an opening 68a corresponding to the gas inlet port 50, and band portions 68b extending from left and right sides of the opening 68a. The flow regulating cloth 69 is formed by sewing up leading ends of the band portions 68b and 68b. The cloth member 68 further includes holes corresponding to the mounting holes 52.

Figure 8A:
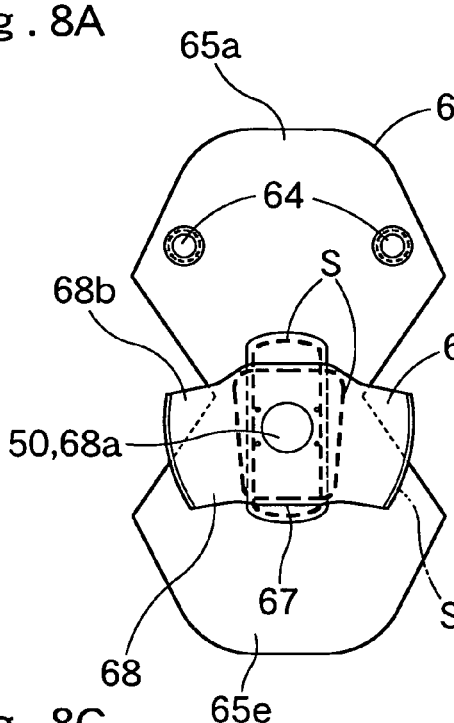
FIGS. 8A to 8E illustrate manufacturing processes of the airbag of FIG. 5 in order.
Figure 8B:
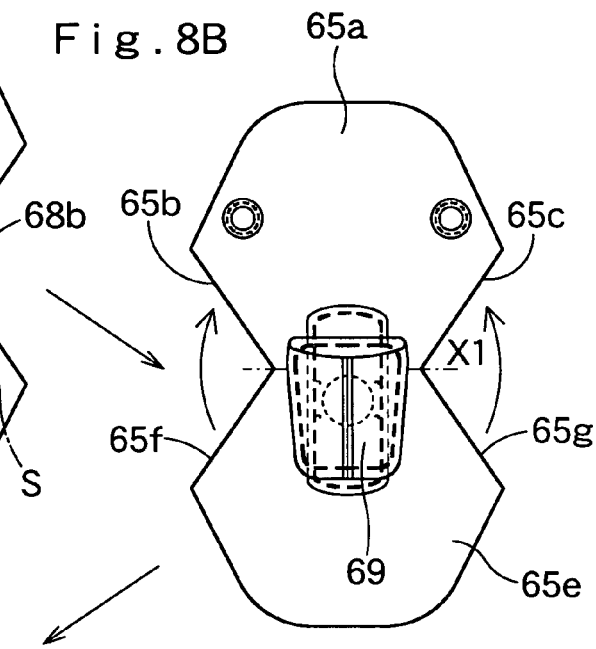

To manufacture the airbag 40, as shown in FIGS. 7 and 8A, the reinforcing cloth 67 and the cloth member 68 are firstly stitched to an inner side to be of the first base cloth 65 in the periphery 51 of the gas inlet port 50 by stitching yarn S. As shown in FIG. 8B, subsequently, leading ends of the band portions 68b of the cloth member 68 are stitched up in an arcuate manner by stitching yarn S, thereby the flow regulating cloth 69 is formed into a predetermined shape.

In the foregoing embodiment, the first base cloth 65 is provided with the vent holes 64, the gas inlet port 50 and the mounting holes 52 in advance, while the cloth member 68 and the reinforcing cloth 67 are provided with the gas inlet port 50 (or 68a) and the mounting holes 52 in advance. However, the vent holes 64, the gas inlet port 50 and the mounting holes 52 may be provided after the reinforcing cloth 67 and the cloth member 68 are stitched to the first base cloth 65.

Figure 8C:
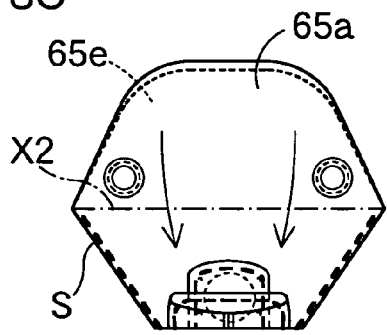

As shown in FIGS. 8B and 8C, thereafter, the first base cloth 65 is folded back on a first base line X1 extending in transverse direction between the upper portion 65a and the lower portion 65e. Then straight edges 65b and 65f of the upper and lower portions 65a and 65b near the first base line X1 are stitched up with stitching yarn S, and the other straight edges 65c and 65g are stitched up, too.

Figure 8D:
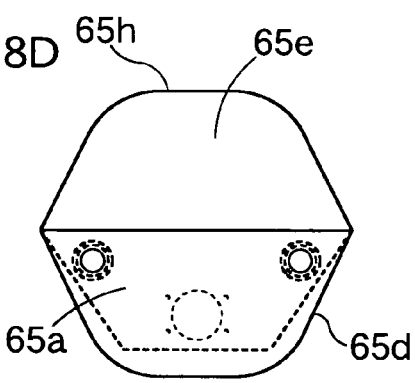

Subsequently as shown in FIGS. 8C and 8D, the upper portion 65a is folded back on a second base line X2 extending between portions projected in transverse directions, so that unstitched edges 65d and 65h of the upper and lower portions 65a and 65e are separated and developed flatly. An outer shape of this developed state is the same as an outer shape of the second base cloth 66.

Figure 8E:
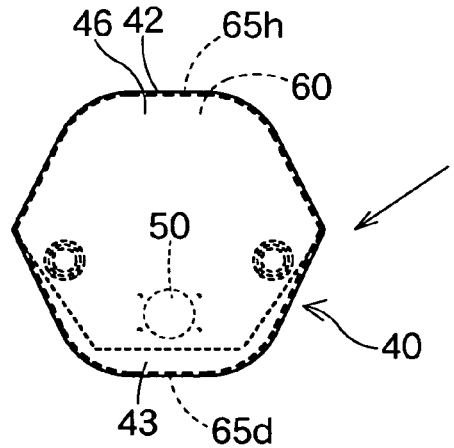

Then as shown in FIGS. 8D and 8E, the second base cloth 66 is applied thereon, and overlapped outer edge is stitched up by stitching yarn S. Thus the airbag 40 is formed into a bag shape.

After the bag shape is formed, the airbag 40 is reversed inside out from the gas inlet port 50 so that stitch allowances may not appear on outer surface.

If it is difficult to reverse the airbag 40 from the gas inlet port 50 because of presence of the flow regulating cloth 69, ends of the band portions 68b of the cloth member 68 may be pulled out of the gas inlet port 50 and stitched up after reversing work of the airbag 40.

Mounting of the airbag 40 thus manufactured on the vehicle is started by placing the retainer 17 inside the airbag 40 so that the bolts 20 may be protruded from the mounting holes 52, and then folding the airbag 40. Then the folded airbag 40 is wrapped by a breakable wrapping sheet 39, as shown in FIG. 3, to keep the folded-up configuration.

Folding process of the airbag 40 includes preparatory folding step and regular folding step, which further includes transverse folding step and vertical folding step.

Figure 9:
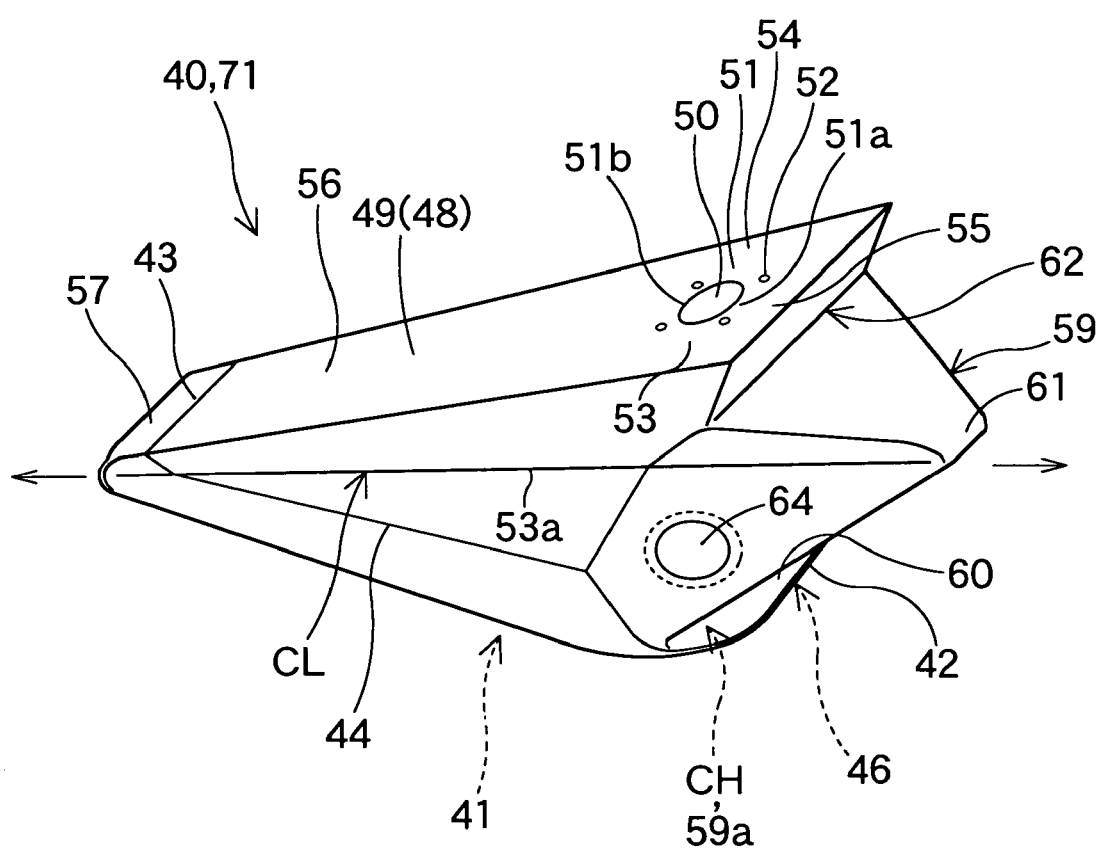
FIG. 9 is a perspective view showing folds of the airbag of FIG. 5 in a preparatory folding step, as viewed from a gas inlet port side.
Figure 10:
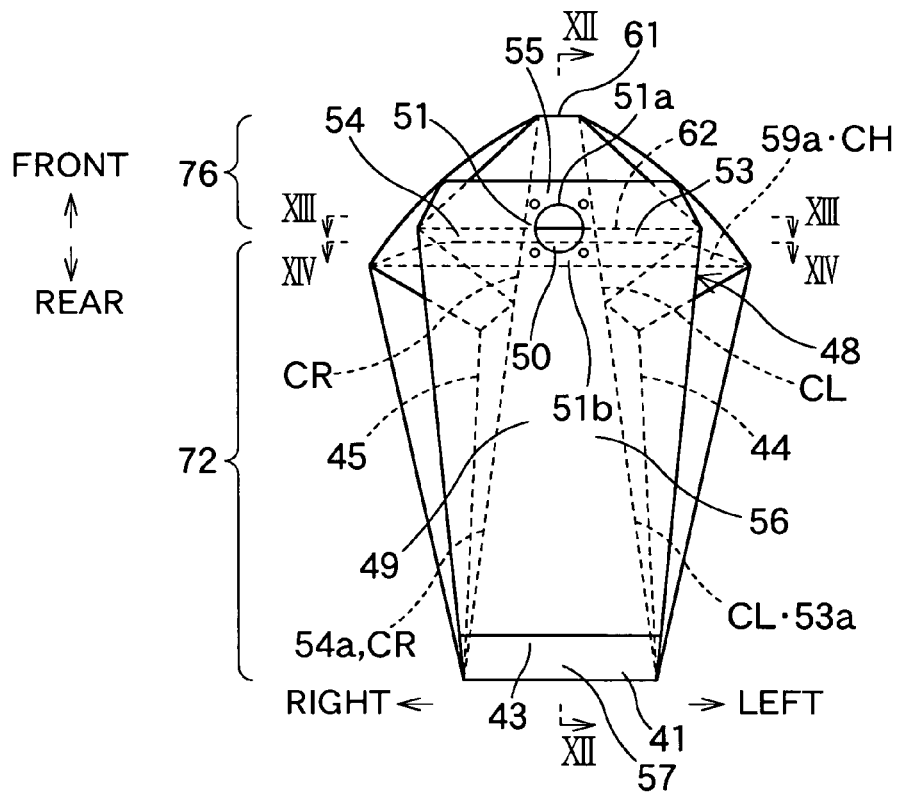
FIG. 10 illustrates the airbag of FIG. 5 in preparatorily folded state, as viewed from a gas inlet port side.
Figure 11:
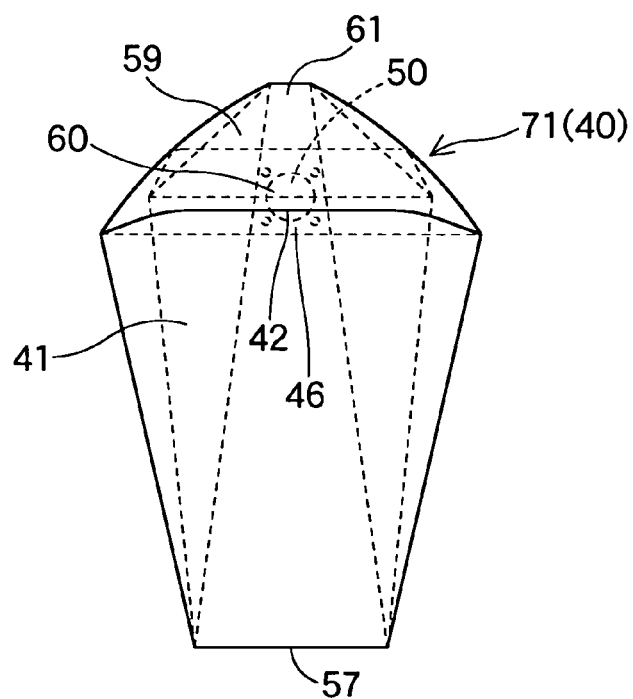
FIG. 11 illustrates the airbag of FIG. 6 as viewed from a passenger's side wall side.

The preparatory folding step provides a preparatory airbag 71 shown in FIGS. 9 to 13. In the preparatory folding step, a portion 60 of the circumferential wall 48 near an upper edge 42 of the passenger's side wall 41 is placed over the gas inlet port 50 to confront the gas inlet port 50 as shown in FIG. 9, and the passenger's side wall 41 except a lower edge 43 vicinity is flatly developed so as to overlap with the lower wall 49 of the circumferential wall 48. Here, the preparatory airbag 71 in FIG. 9 is illustrated as reversed upside down from usual mounted condition on vehicle, and shows the gas inlet port 50 in upper side. Further in the first embodiment, a generally entire area of the passenger's side wall 41 is flatly developed except the vicinities of left edge 44, right edge 45 and lower edge 43 while the circumferential wall 48 is folded up.

In the preparatory folding step, in the circumferential wall 48, left and right portions 53 and 54 of the gas inlet port 50 and the portion 60 near the upper edge 42 of the passenger's sidewall 41 are folded on valley folds CL, CR and CH, respectively. More specifically, left portion 53 and right portion 54 of the gas inlet port 50 are folded so that generally intermediate portions 53a and 54a between the inlet port 50 and left and right edges 44 and 45 of the flatly developed passenger's side wall 41 may be brought closer to the gas inlet port 50, i.e., the folds CL and CR may be brought closer to each other, and may be arranged at side of the passenger's side wall 41 in the gas inlet port periphery 51. Thus the left and right portions 53 and 54 are folded in on valley folds CL and CR extending along front-rear direction. As to the portion 60 of the circumferential wall 48 near the upper edge 42, a generally intermediate portion 59a between a later-described projected top 61 in the upper circumferential wall 59 or front end of the folds CL and CR and the passenger's side wall upper edge 42 is brought closer to the gas inlet port 50 and placed at side of the passenger's side wall 41 in the gas inlet port periphery 51. Thus the upper edge vicinity 60 is folded in on a valley fold CH extending along transverse direction.

The preliminary folding is actually done by gripping a generally intermediate portion in the circumferential wall 48 between transverse center of a front edge 51a of the gas inlet port 50 and transverse center of the passenger's side wall upper edge 42, which will be a projected top 61, and a transverse center 57 of a rear side portion 56 of the gas inlet port 50 in the circumferential wall 48 in the vicinity of a lower edge 43 of the passenger's side wall 41, and by pulling the gripped portions 61 and 57 in front and rear directions to separate them from each other. The grip portion 57 in the rear side portion 56 is desirably as close to the passenger's side wall lower edge 43 as possible, so that a generally entire area of the passenger's side wall 41 may be developed flatly in the preliminary folding step.

Here, a portion 62 ranging from a front portion 55 of the gas inlet port 50 to the projected top 61 in the circumferential wall 48 is valley-folded toward the gas inlet port 50 so that the periphery 51 of the gas inlet port 50 may be flat and parallel to the passenger's side wall 41.

Figure 12:
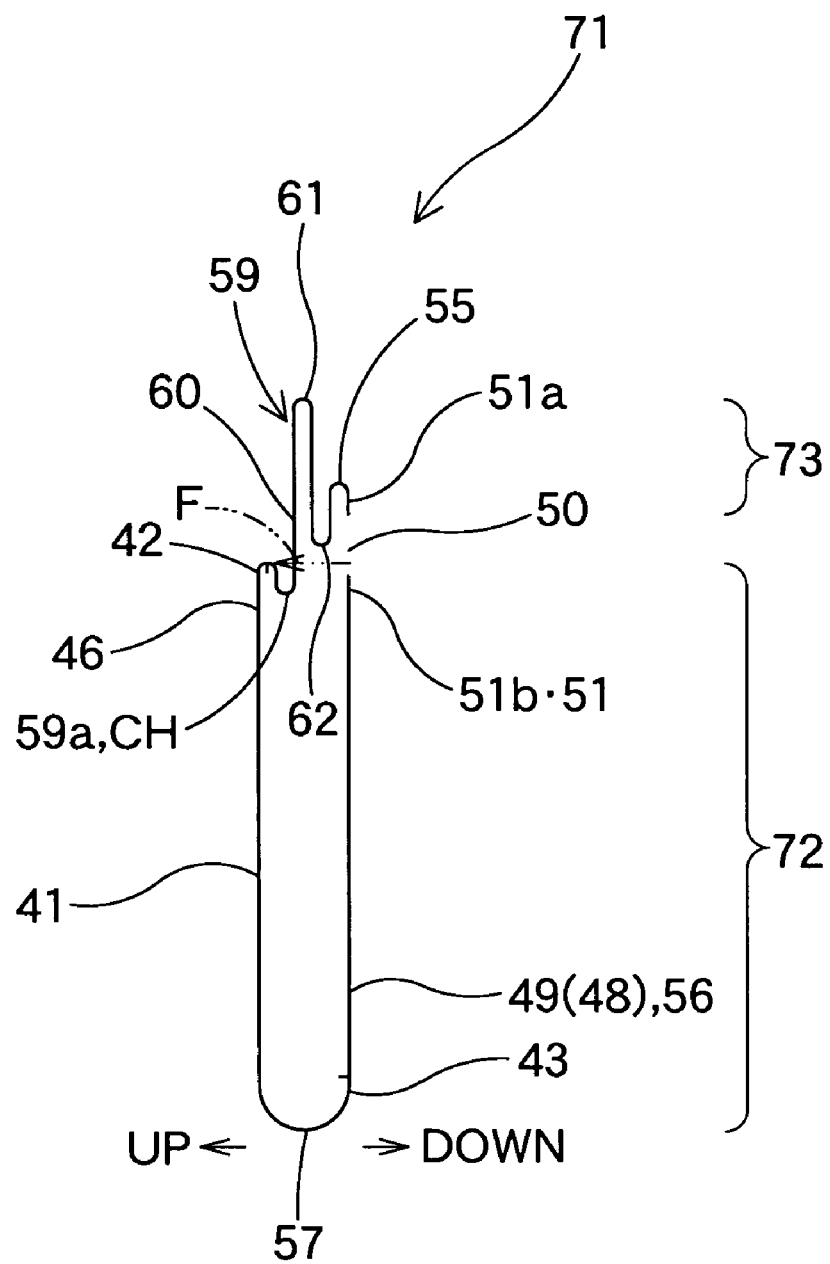
FIG. 12 is an end view of FIG. 10, taken along line XII-XII.
Figure 13:
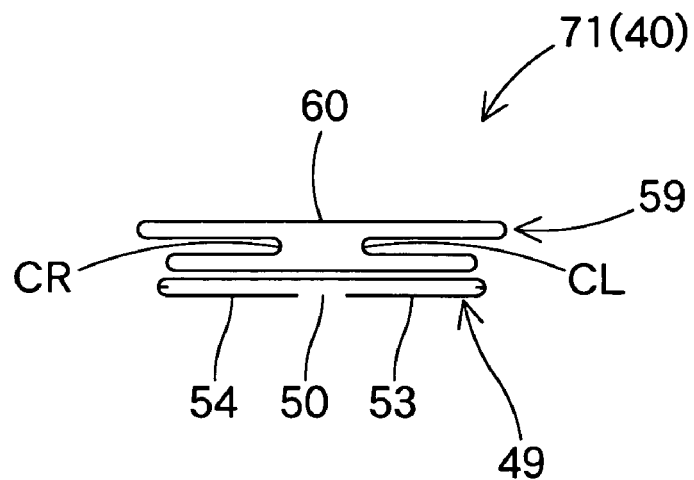
FIG. 13 is an end view of FIG. 10, taken along line XIII-XIII.
Figure 14:
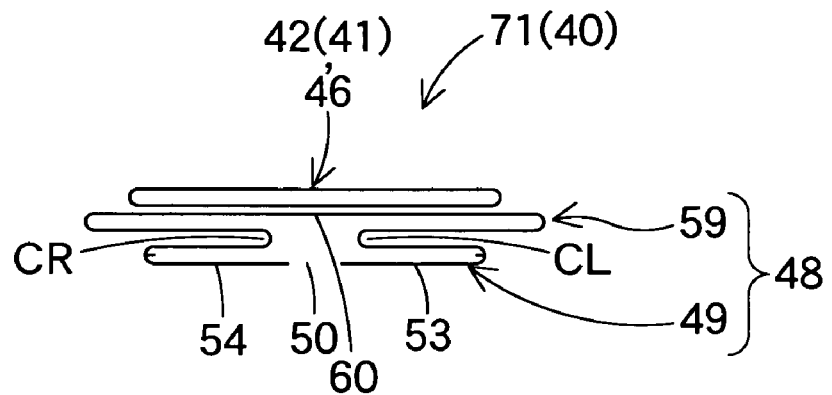
FIG. 14 is an end view of FIG. 10, taken along line XIV-XIV.

In the preparatory airbag 71 of the first embodiment, moreover, the valley folds CH and 62 in the upper circumferential wall 59 are arranged at frontward of rear edge 51b of the gas inlet port 50, as shown in FIG. 12. More specifically, in the preparatory airbag 71, the upper circumferential wall 59 to be located above the gas inlet port 50 upon airbag deployment is folded and disposed in frontward of the rear edge 51b of the gas inlet port 50.

The regular folding step applied after the preparatory folding step includes a transverse folding step to fold the preparatory airbag 71 on transverse folds to reduce its longitudinal length, and a vertical folding step to fold the airbag 71 on longitudinal folds to reduce its transverse width.

Figure 15A:
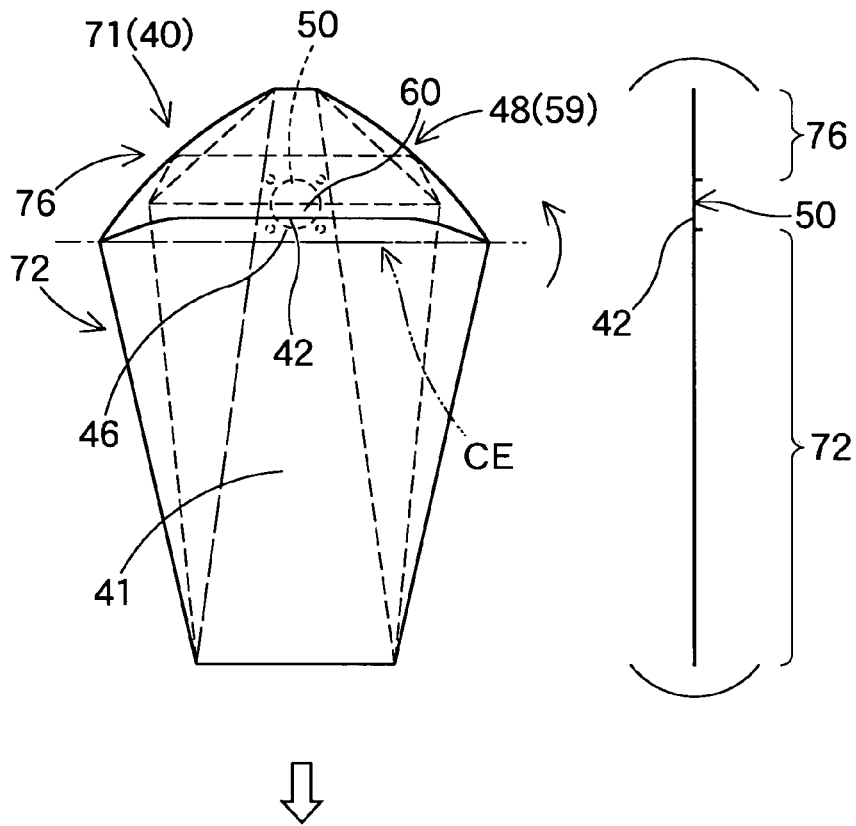
FIGS. 15A and 15B illustrate folding processes after the preparatory folding in order.

More specifically, the transverse folding step is applied in consideration of space-saving automated folding by a folding machine. Firstly, as shown in FIGS. 15A and 15B, a rear portion 72 of the gas inlet port 50 in the preparatory airbag 71 is folded toward the upper edge 42 of the passenger's side wall 41 on a fold CE proximate to the gas inlet port 50.

Figure 15B:
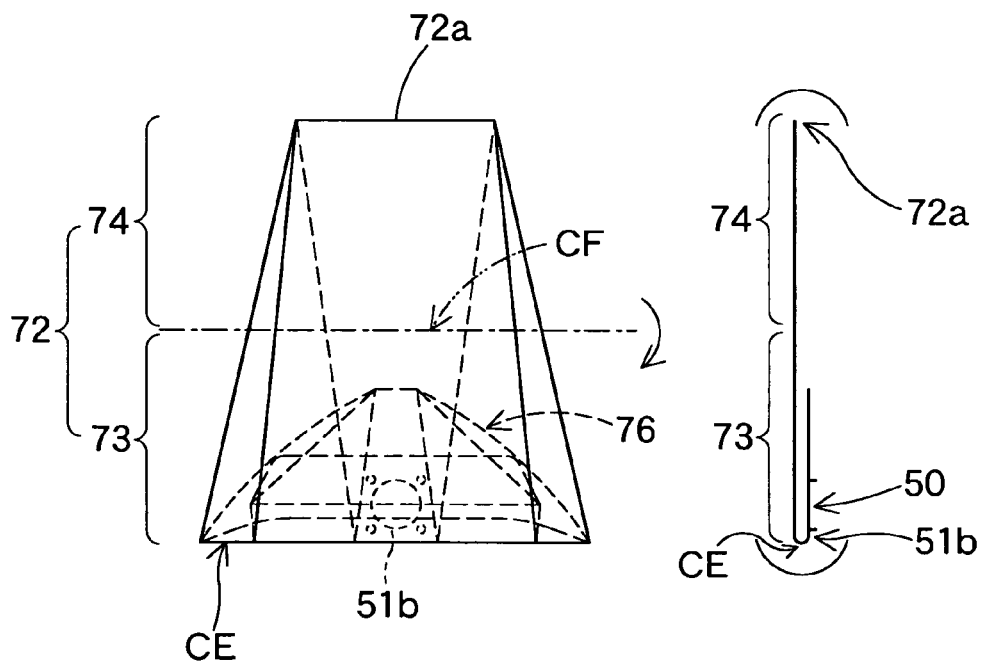
Figure 16A:
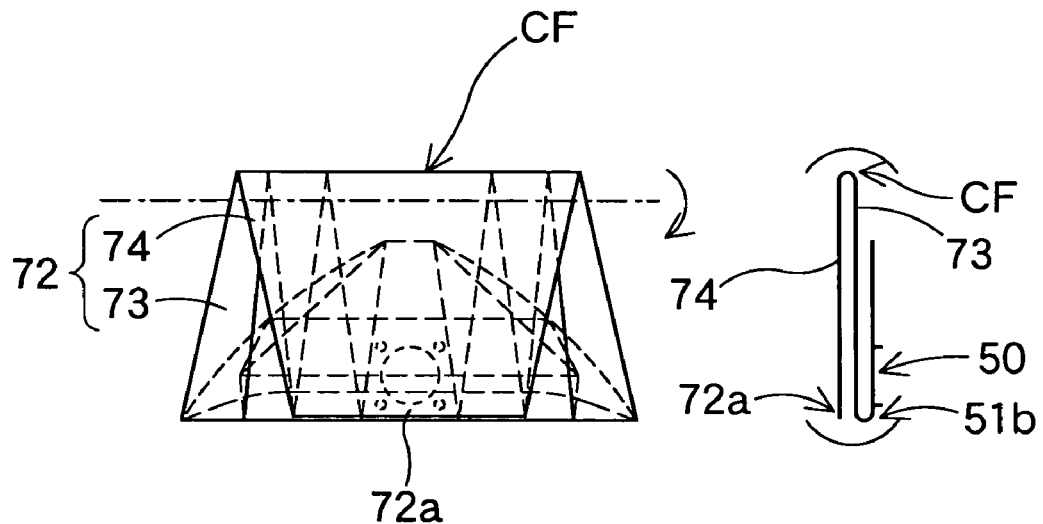
FIGS. 16A and 16B illustrate folding processes following FIG. 15B.

As shown in FIGS. 15B and 16A, subsequently, the rear portion 72 is folded in two on a transverse fold CF in a manner to bring a rear end (leading end) 72a of the rear portion 72 closer to the rear edge 51b of the inlet port 50 in a lower side of the lower wall 49 of the circumferential wall 48, so that a folded-back portion 74 and a main portion 73 of the rear portion 72 overlap with each other.

Figure 16B:
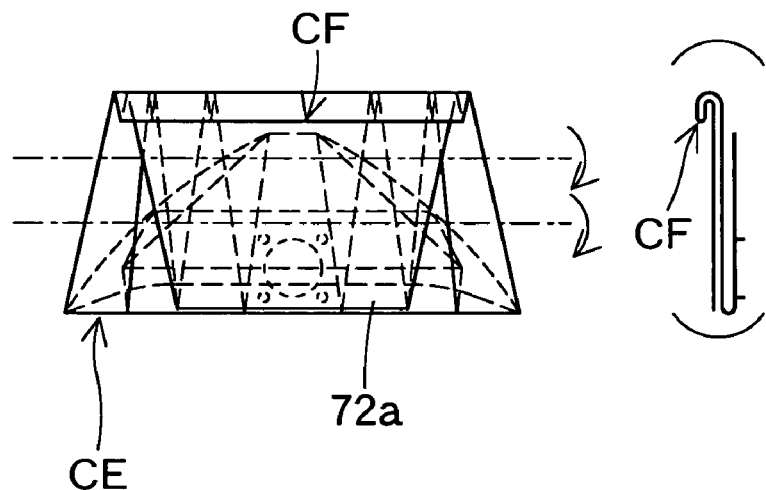
Figure 17A:
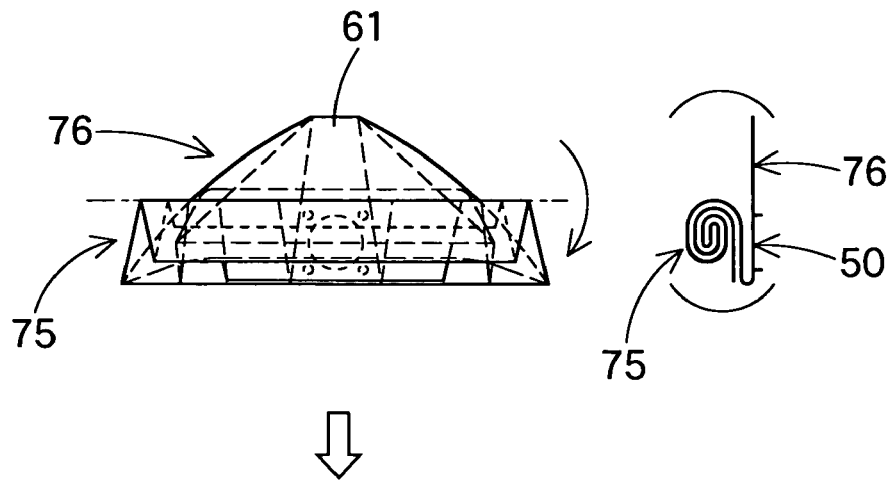
FIGS. 17A, 17B and 17C illustrate folding processes following FIG. 16B.

Thereafter, as shown in FIGS. 16B and 17A, the rear portion 72 folded in two is roll-folded from the vicinity of the fold CF so that longitudinal length is reduced and a folded portion 75 is placed right above the gas inlet port 50 in the passenger's side wall 41. Here, the rear portion 72 may be folded in a bellows-fashion of folding on subsequent crest and valley folds.

Figure 17B:
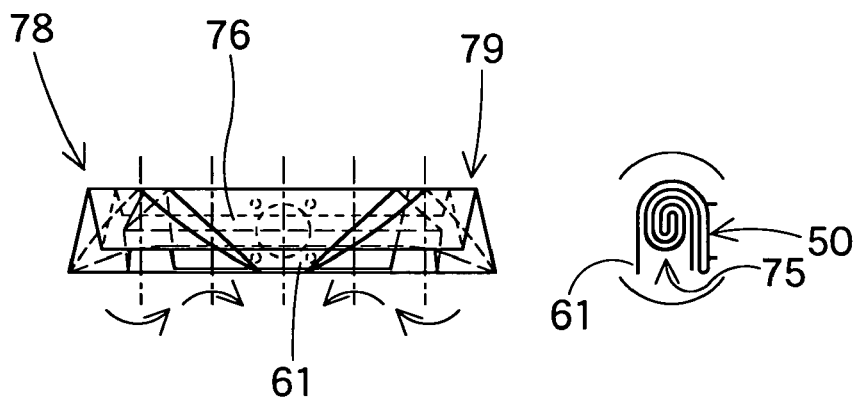

As shown in FIGS. 17A and 17B, a portion 76 forward of the inlet port 50 in the preparatory airbag 71 is folded and placed over the folded portion 75 to reduce the longitudinal length. Thus the transverse folding step is completed. In the first embodiment, since the portion 76 is short, it is merely placed over the folded portion 75. However, if the portion 76 is elongate, it may be placed on the folded portion 75 after being roll-folded or bellows-folded.

Figure 17C:
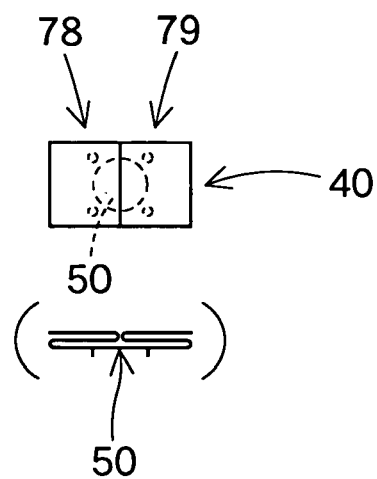

Thereafter, the vertical folding is applied to a left portion 78 and a right portion 79 of the gas inlet port 50 of the airbag 40 having gone through the transverse folding step. More specifically, as shown in FIGS. 17B and 17C, the left portion 78 and the right portion 79 are folded on folds along longitudinal direction to reduce transverse width. In the first embodiment, each of the left and right portions 78 and 79 is bellows-folded and placed over the gas inlet port 50.

When the folding work of the airbag 40 is thus completed through the vertical folding step, the folded airbag 40 is wrapped by a breakable wrapping sheet 39 to keep the folded-up configuration, as described above.

Then, the folded airbag 40 is located on the bottom wall 25 of the case 24 from the top opening 24a while inserting the individual bolts 20 into the mounting holes 27 from above. Subsequently, an upper portion 12a of the body 12 of the inflator 11 is inserted through the insert hole 26, the gas inlet port 50, and the insert hole 19 from lower side, and the individual bolts 20 protruded downward from the bottom wall 25 are inserted through the mounting holes 15 of the flange 14 of the inflator 11. Thereafter, the nuts 16 are fastened with the bolts 20 protruded from the flange 14. Thus the airbag 40 and the inflator 11 are attached to the bottom wall 25 of the case 24.

Thereafter, the side wall 29 of the case 24 is inserted within the joint wall 36 of the airbag cover 32 in the dashboard 1 mounted on the vehicle, and the individual retaining pawls 30 of the case 24 are inserted into the retaining holes 37 of the joint wall 36 to be retained by the joint wall 36. If the bolts 9 are fastened into the nuts 28a of the individual brackets 28 through the mounting seats 8a, the airbag device M1 for front passenger's seat is mounted on the vehicle.

Alternatively, the mounting of the airbag device M1 on the vehicle may be made by attaching the airbag 40 and the inflator 11 to the case 24, attaching this case 24 to the airbag cover 32 of the dashboard 1, and securing this airbag device M1 to the body 6 with the bolts 9 when mounting the dashboard 1 on the vehicle.

After mounting the airbag device M1 on the vehicle, when inflation gas G is discharged from the gas discharge ports 13 of the inflator 11, the airbag 40 inflates and breaks the wrapping sheet 39. The airbag 40 further breaks the breakable portion 35 of the airbag cover 32 and opens the doors 33F and 33B as indicated by double-dotted lines in FIGS. 2 and 3, and then protrudes from an opening 38 provided by the opening of the doors 33F and 33B. Reference numeral W in FIG. 2 represents a windshield.

In the airbag device M1 for front passenger's seat of the first embodiment, the airbag 40 admits inflation gas G from the gas inlet port 50 and deploys in a generally reverse manner to the folding process, i.e., while unfolding transverse and vertical folds in the regular folding process and folds in the preparatory folding process.

In the preparatory folding step, the portion 60 of the circumferential wall 48 near the upper edge 42 of the passenger's side wall 41 is disposed in a position to confront the gas inlet port 50, when the passenger's side wall 41 is flatly developed over the lower part 49 of the circumferential wall 48. Accordingly, the portion 60 is pushed up intensely by a pressure F (refer to FIG. 12) of inflation gas G having just flown in prior to other portions of the passenger's side wall 41 such as the lower part 43, so that the passenger's side wall 41 is easily disposed generally vertically.

Figure 19:
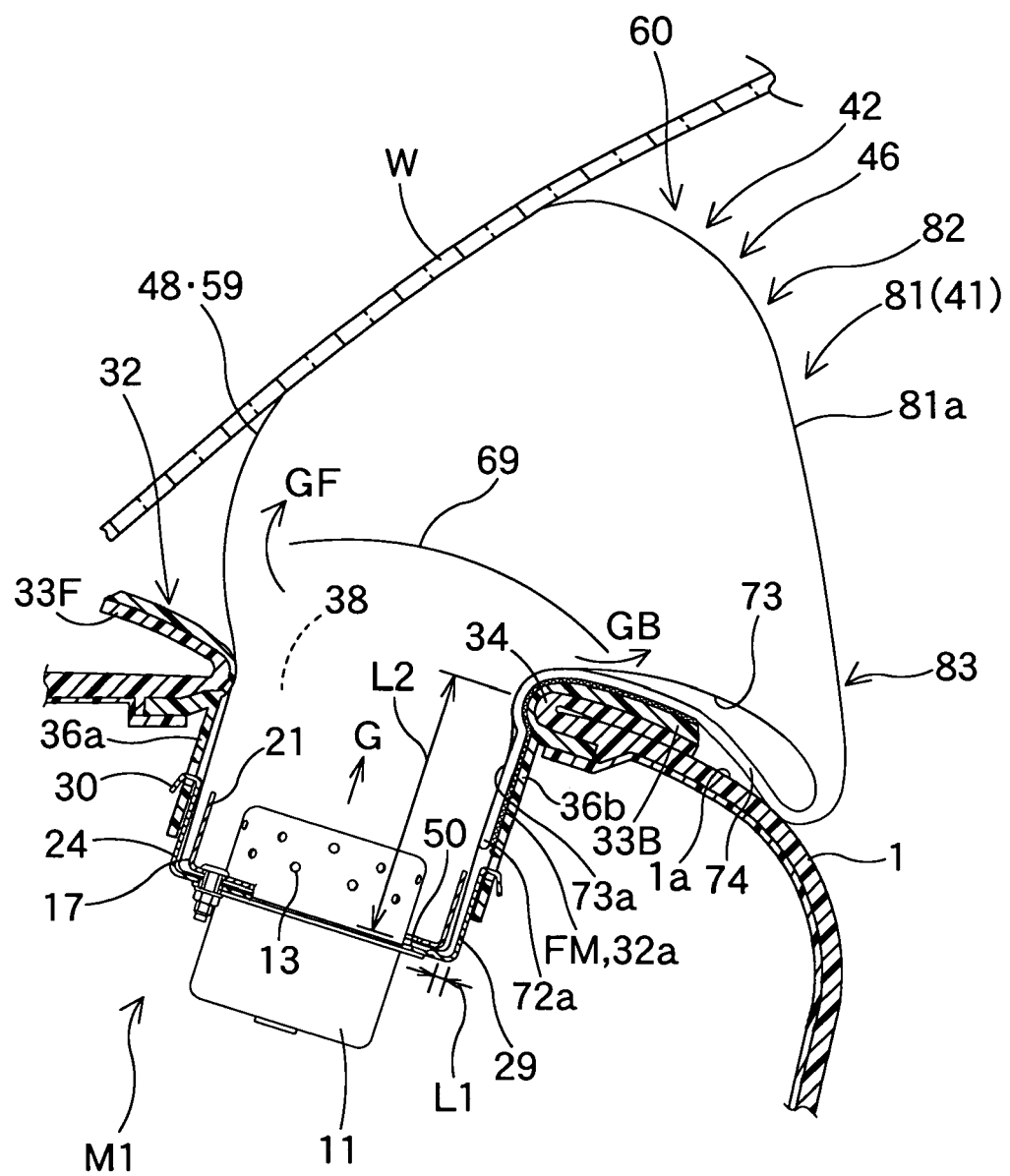
FIGS. 19, 20, 21A and 21B illustrate the airbag device of FIG. 1 in service in order, from side of vehicle.
Figure 20:
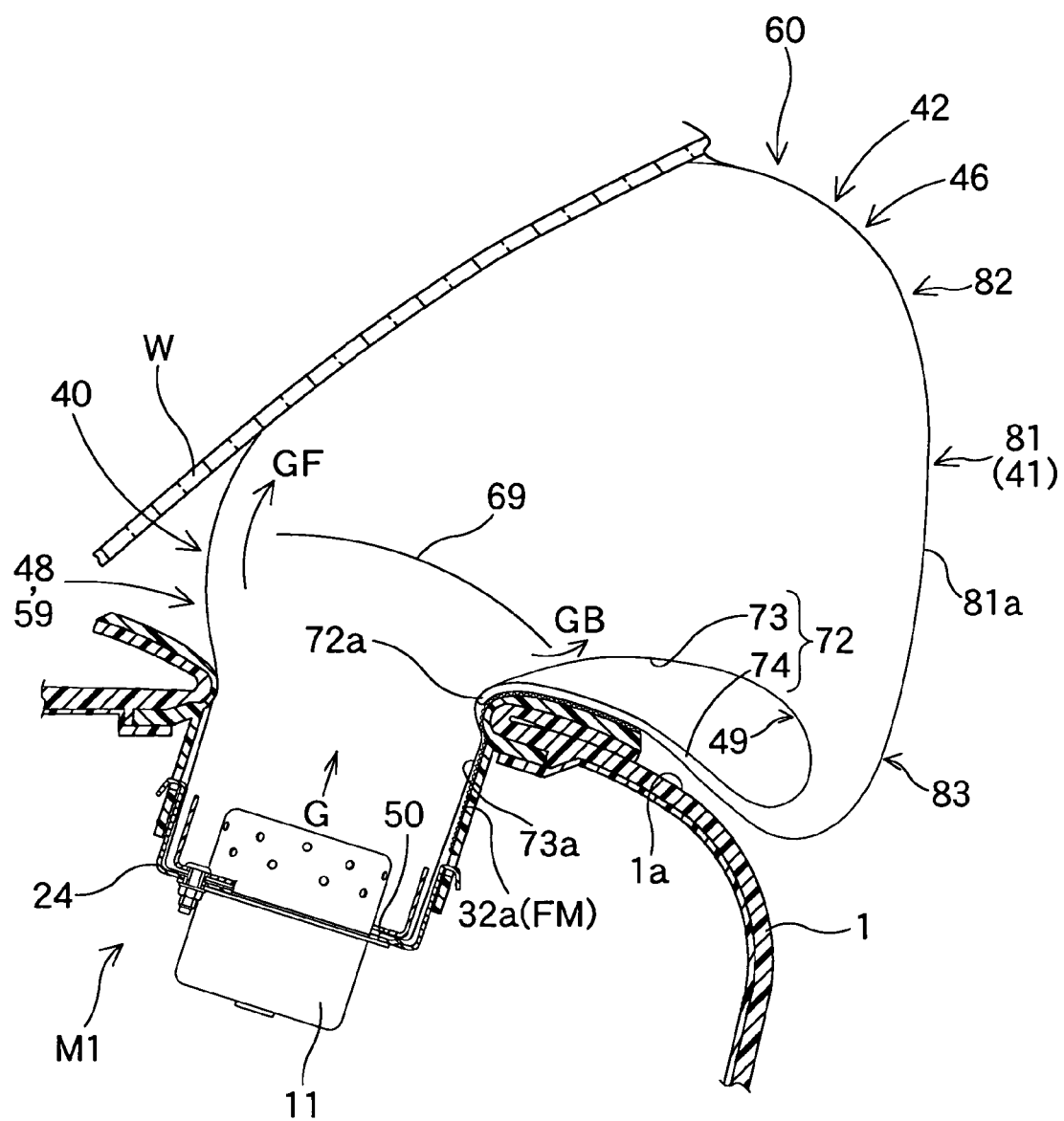
Figure 21A:
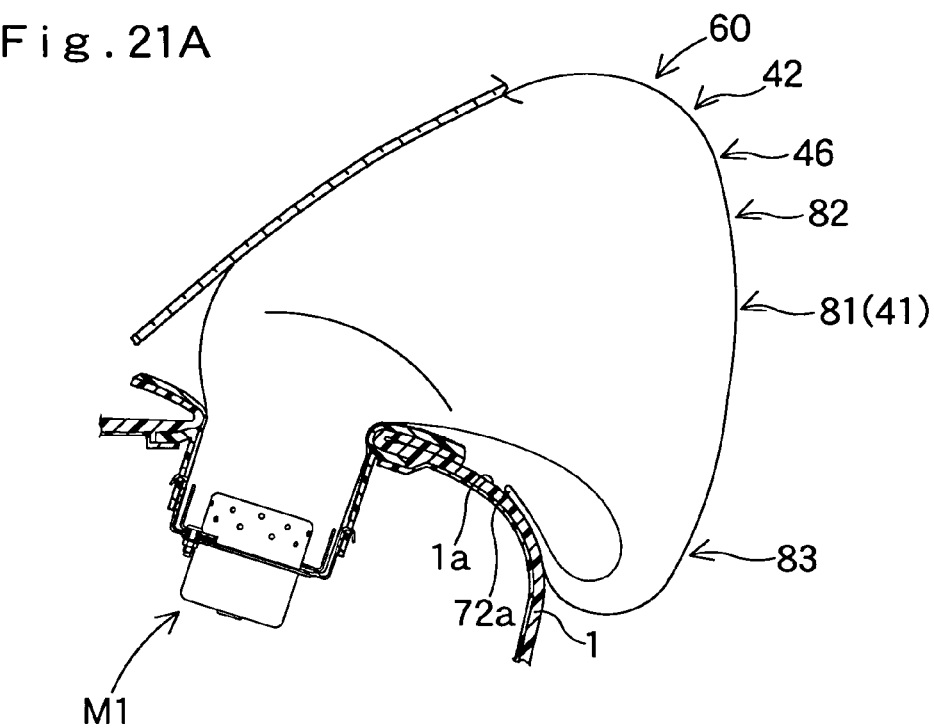
Figure 21B:
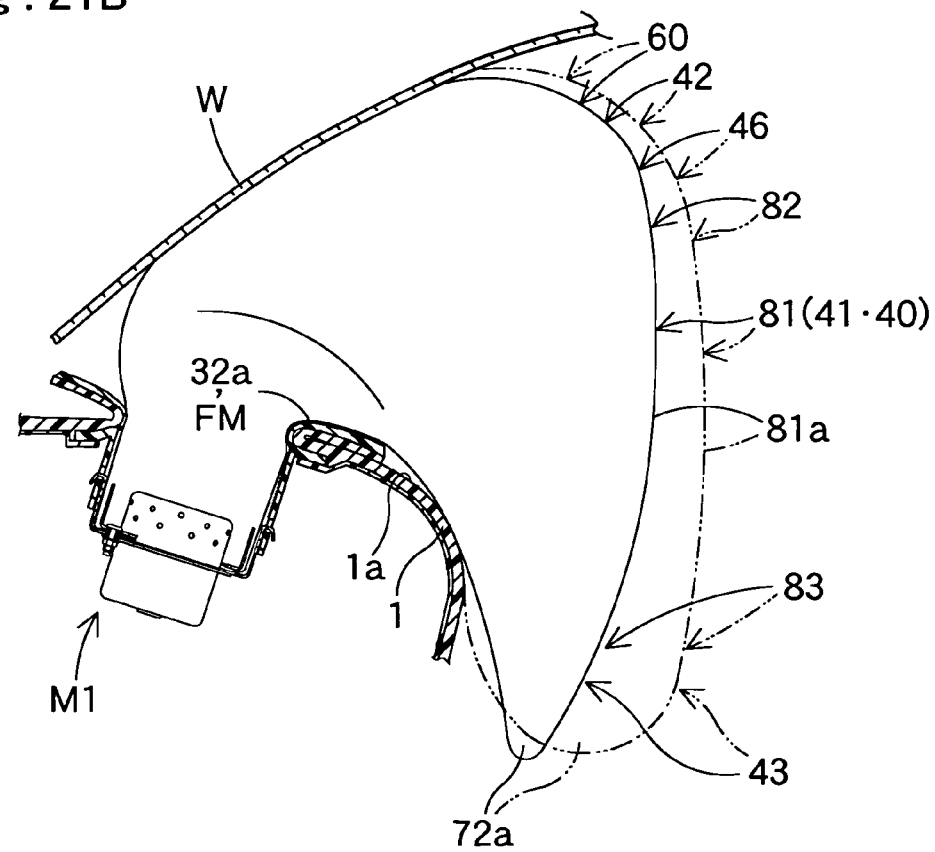
Figure 22:
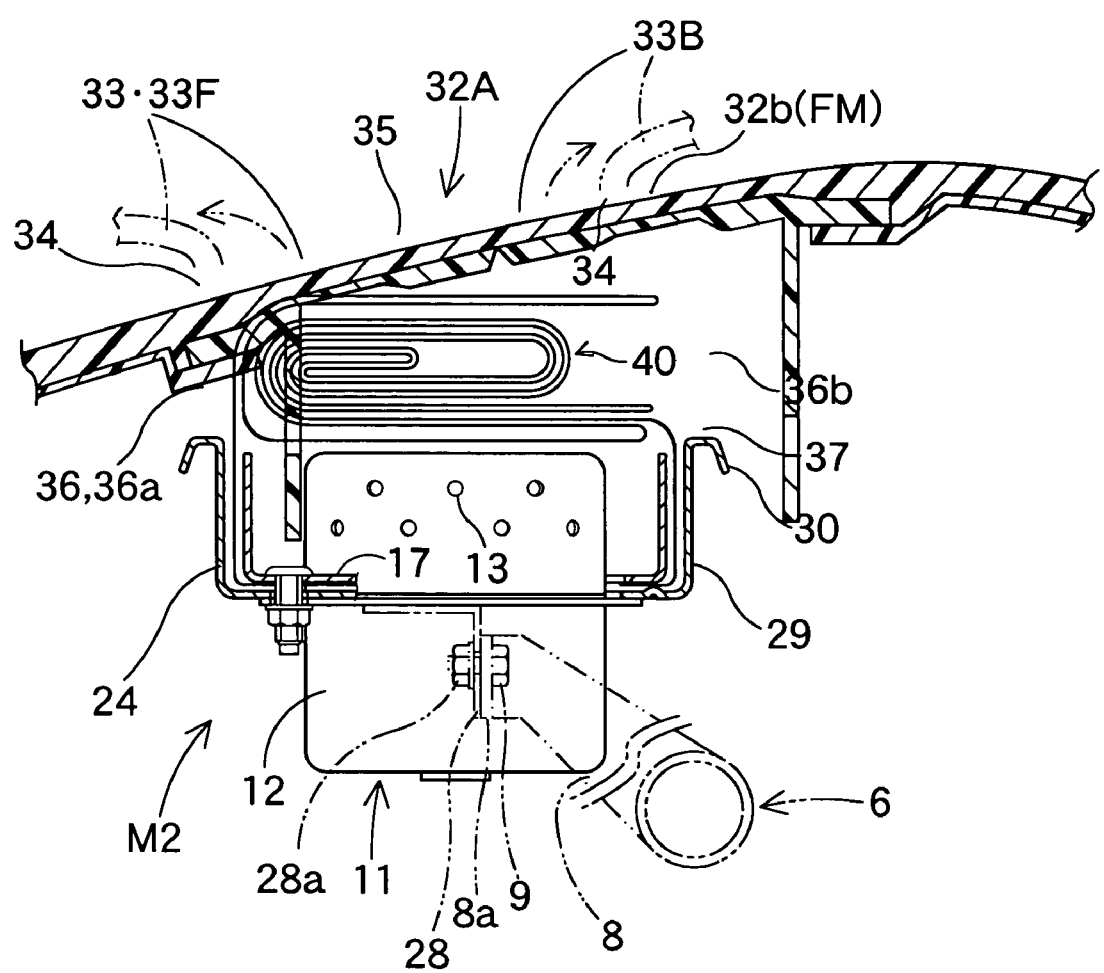
FIG. 22 is a schematic enlarged section of a second embodiment of the airbag device, taken along front-rear direction of vehicle.
Figure 23:
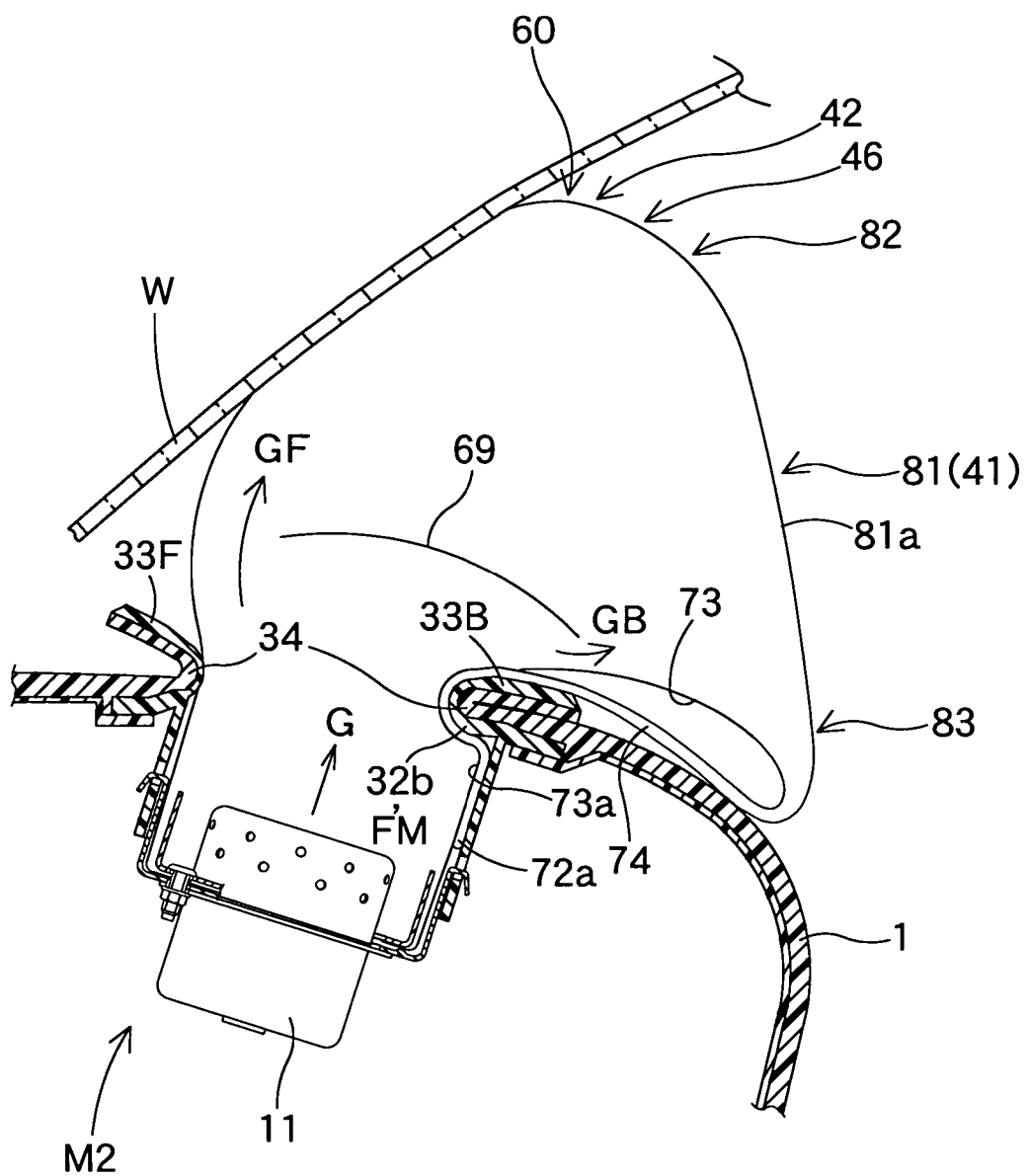
FIGS. 23, 24, 25A and 25B illustrate the airbag device of FIG. 22 in service in order, from side of vehicle.
Figure 24:
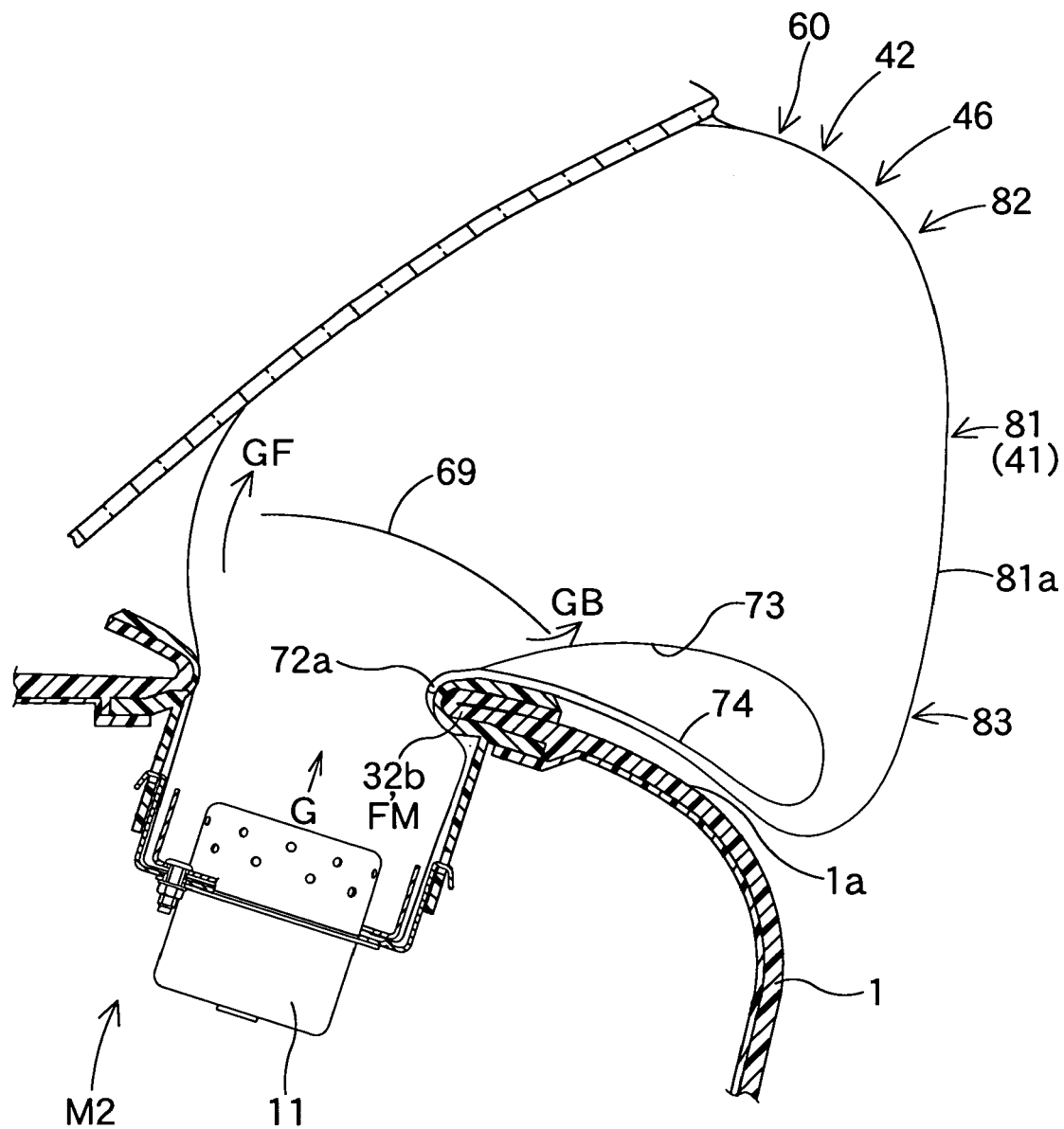
Figure 25A:
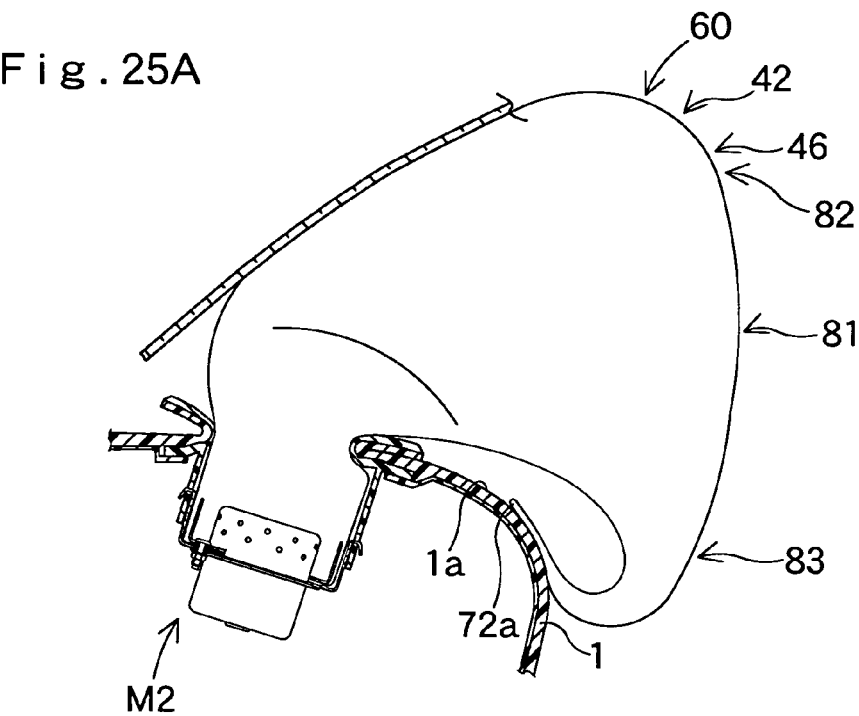
Figure 25B:
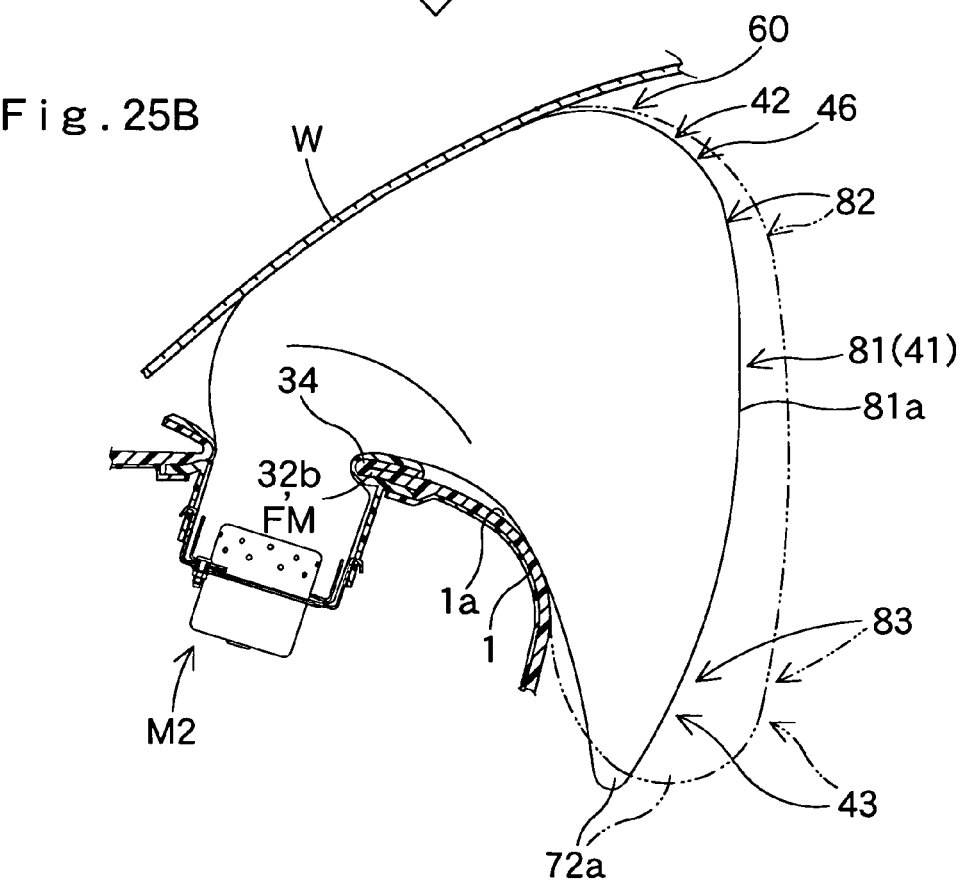
Figure 26:
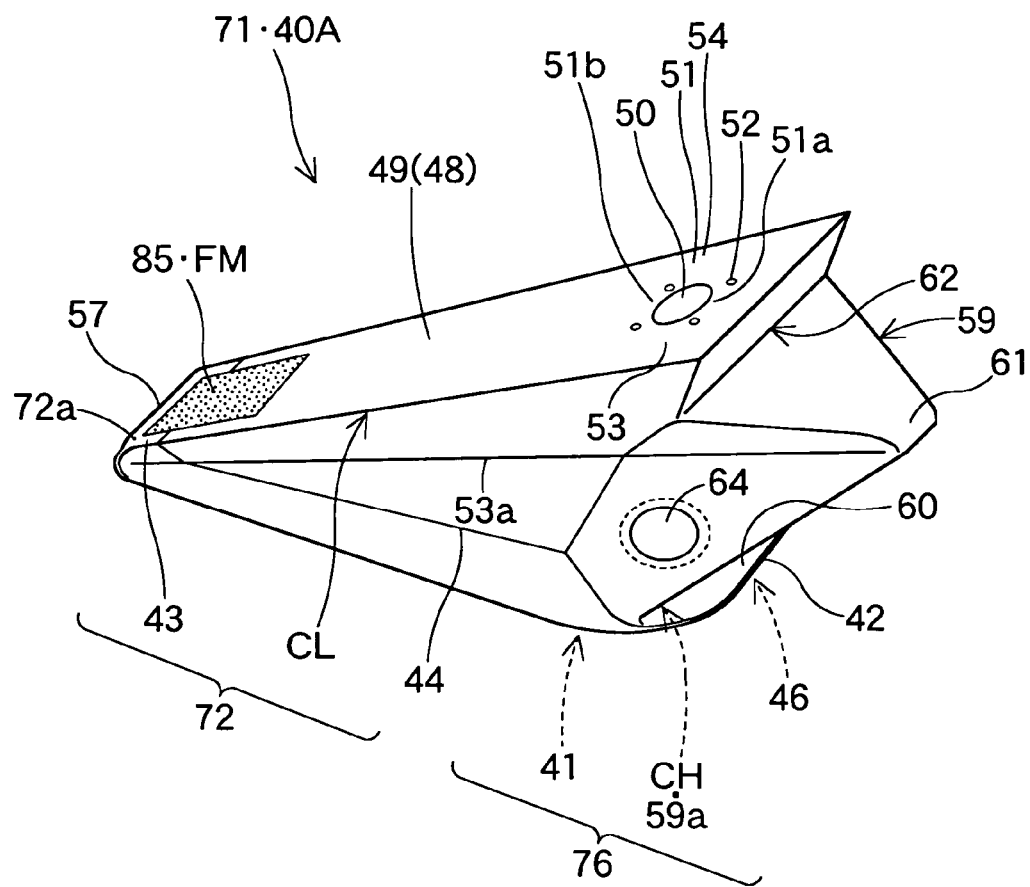
FIG. 26 is a perspective view of an airbag employed in a third embodiment of the airbag device in preparatorily folded state.
Figure 27:
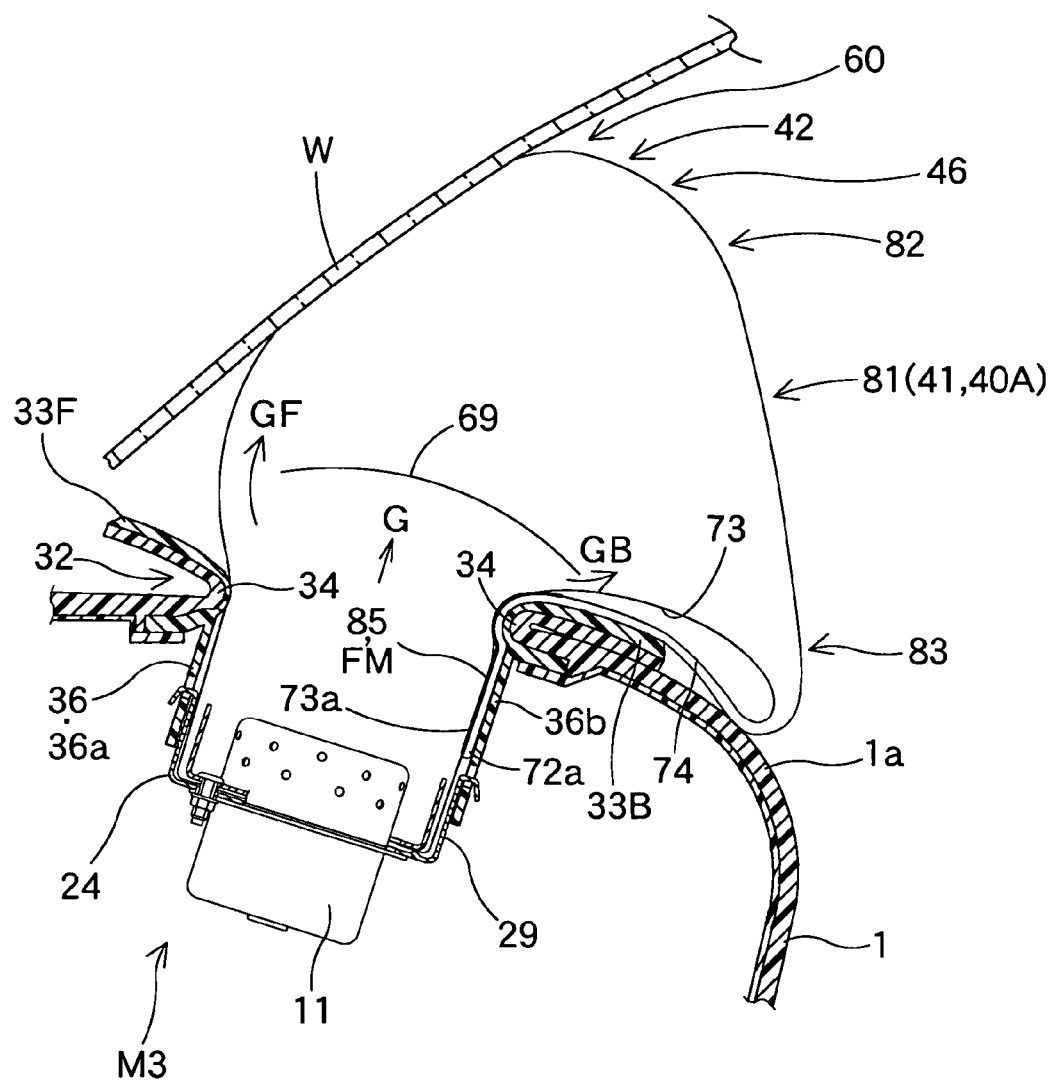
FIGS. 27, 28, 29A and 29B illustrate the airbag device of FIG. 26 in service in order, from side of vehicle.
Figure 28:
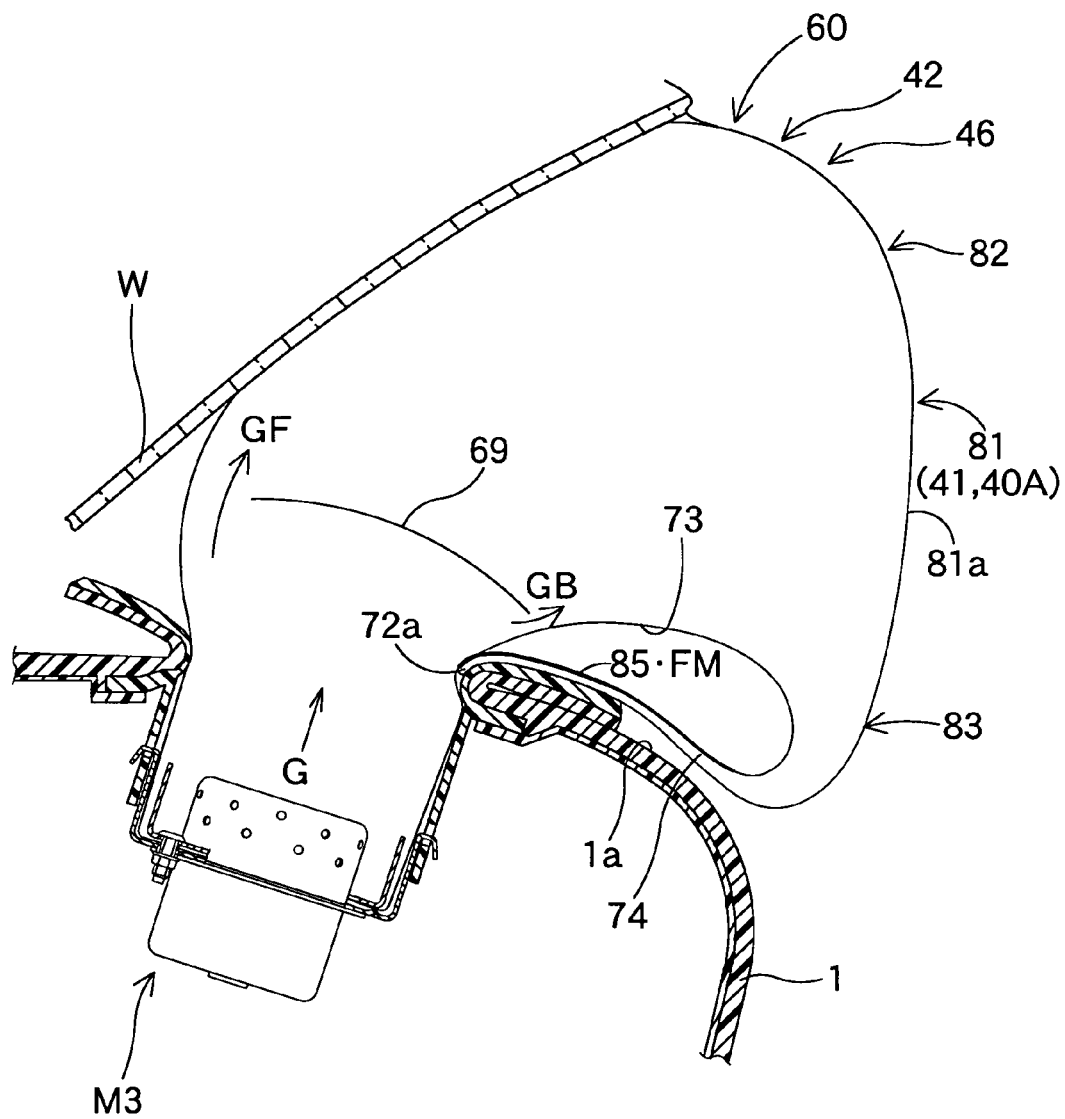
Figure 29A:
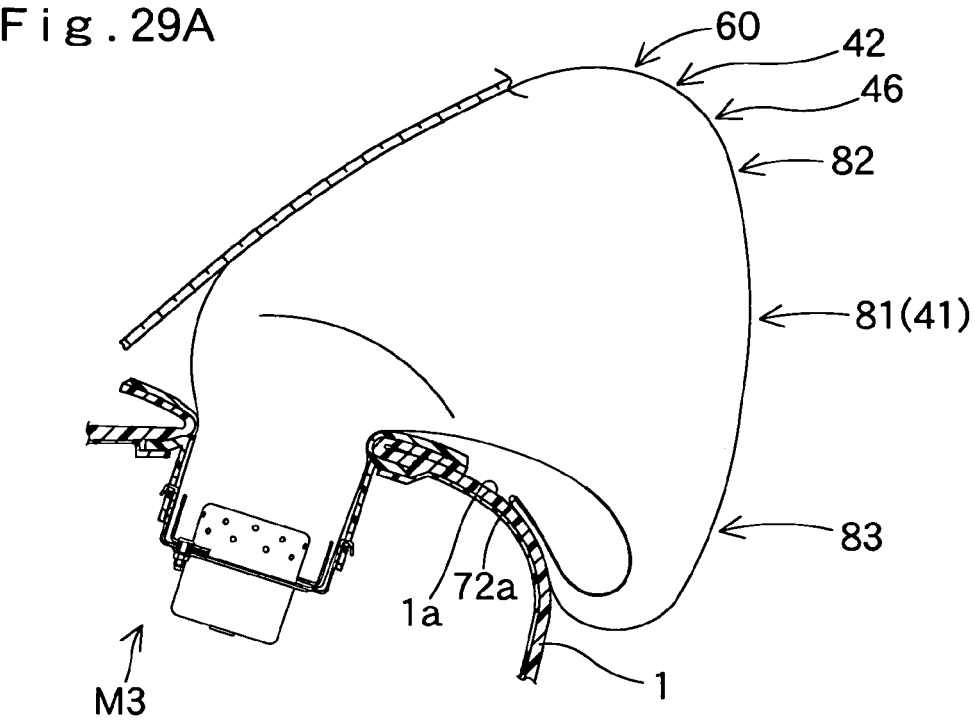
Figure 29B:
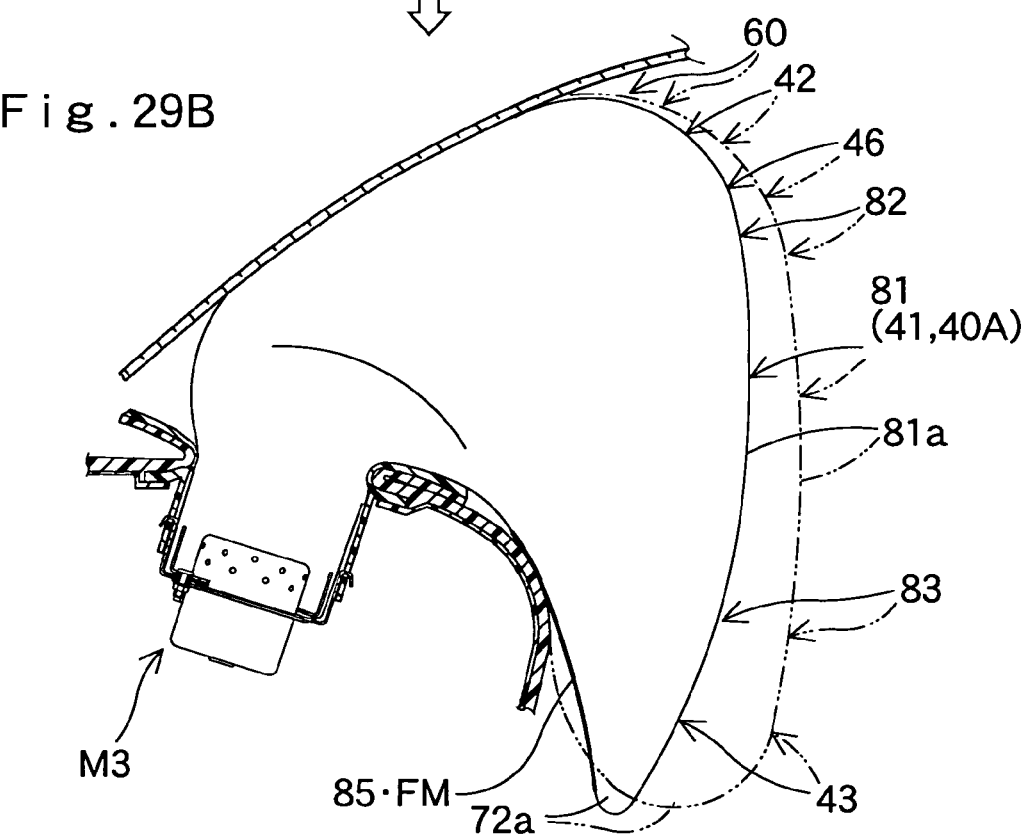
Figure 30:
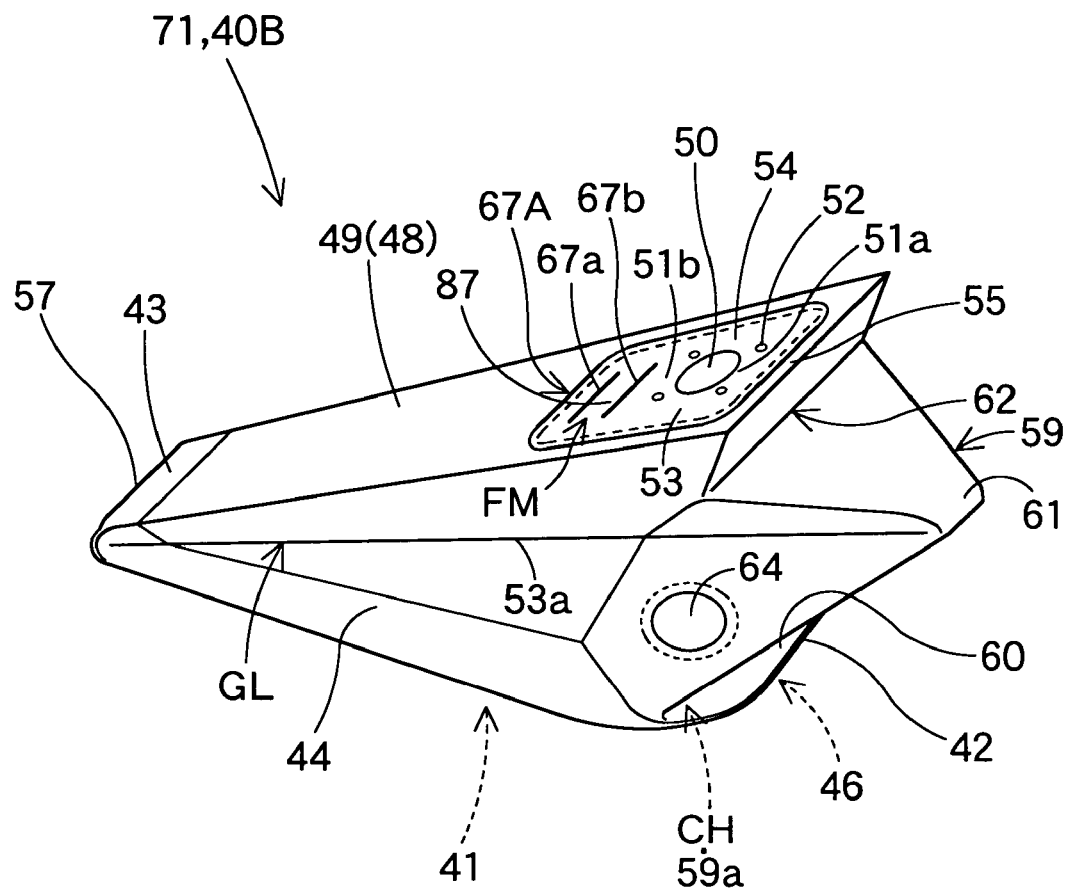
FIG. 30 is a perspective view of an airbag employed in a fourth embodiment of the airbag device in preparatorily folded state.
Figure 31:
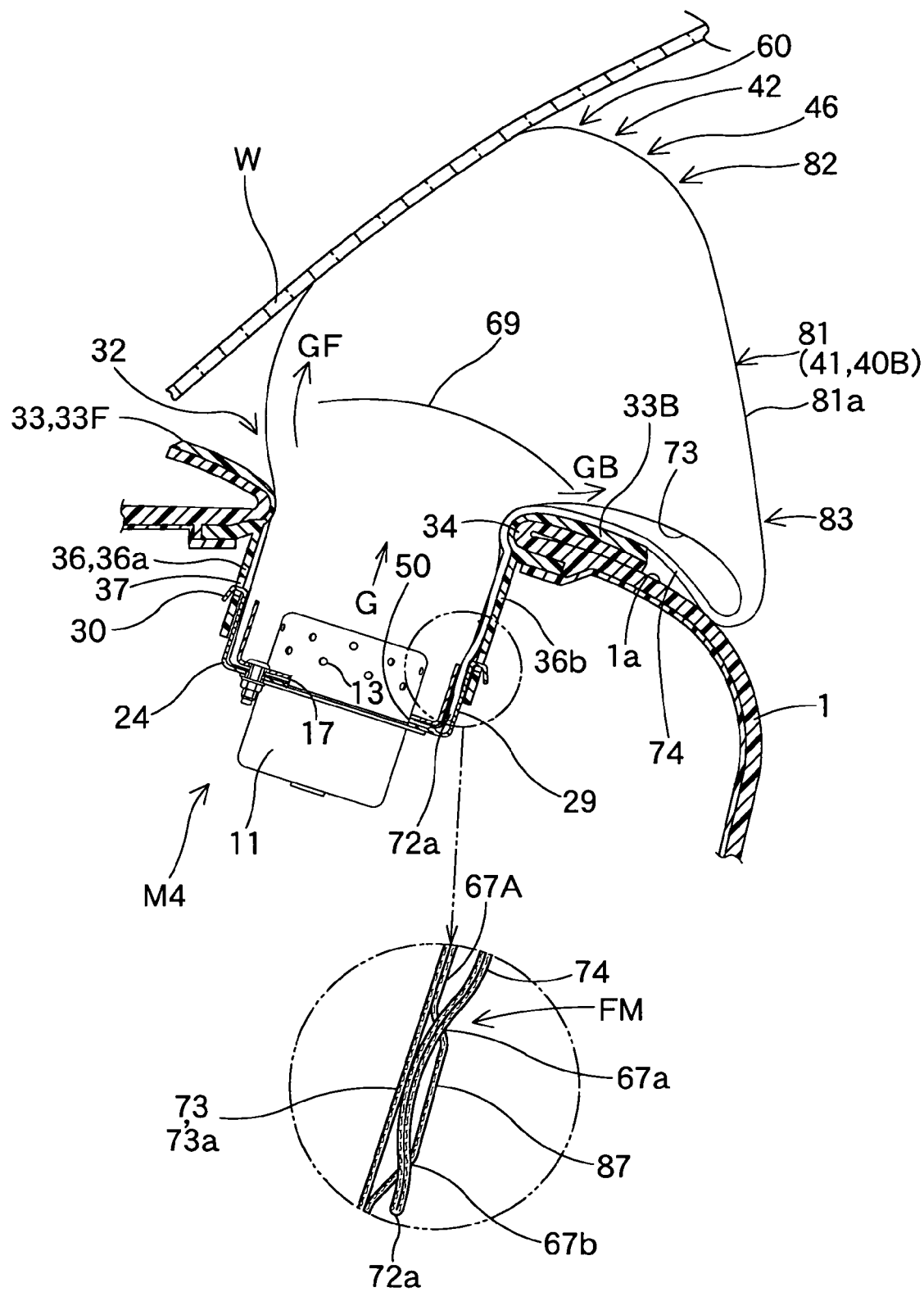
FIGS. 31, 32, 33A and 33B illustrate the airbag device of FIG. 30 in service in order, from side of vehicle.
Figure 32:
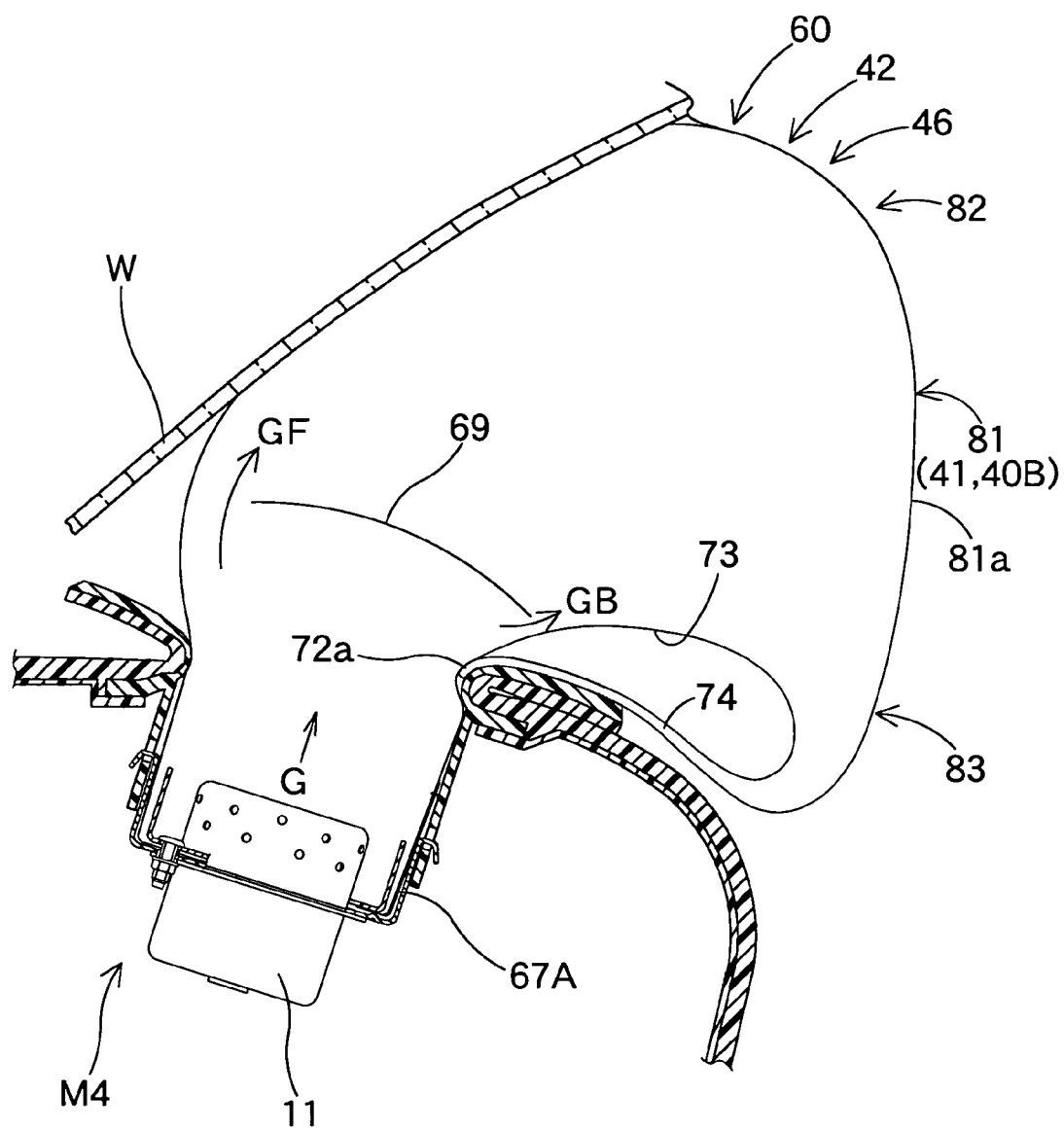
Figure 33A:
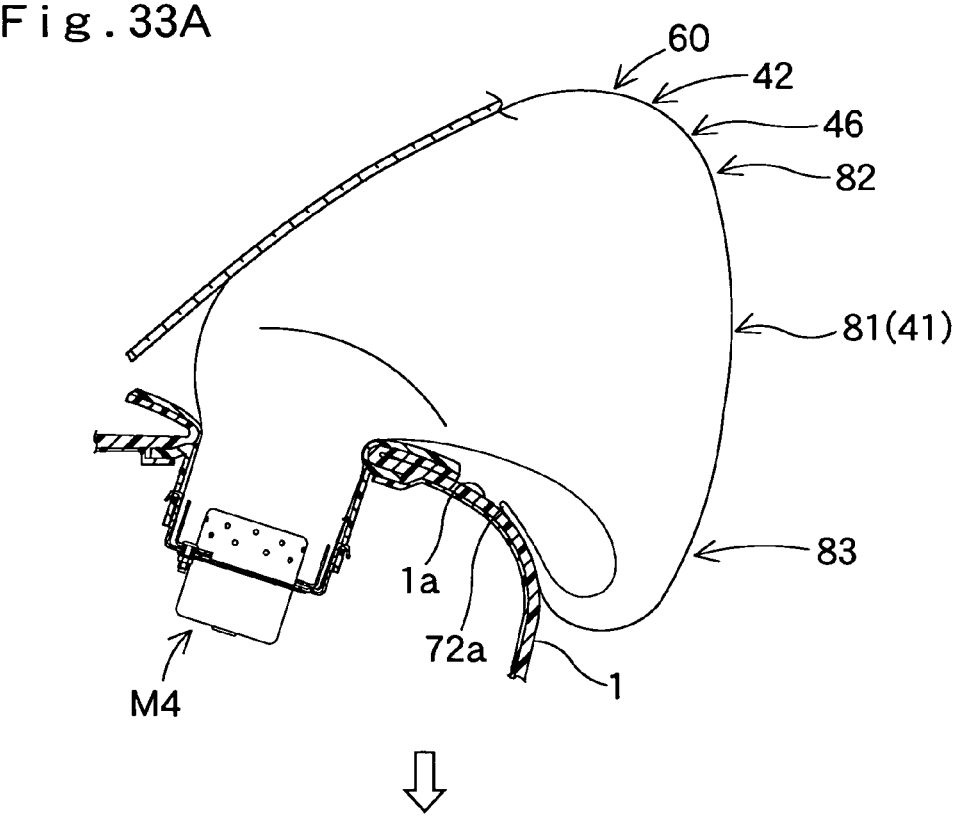
Figure 33B:
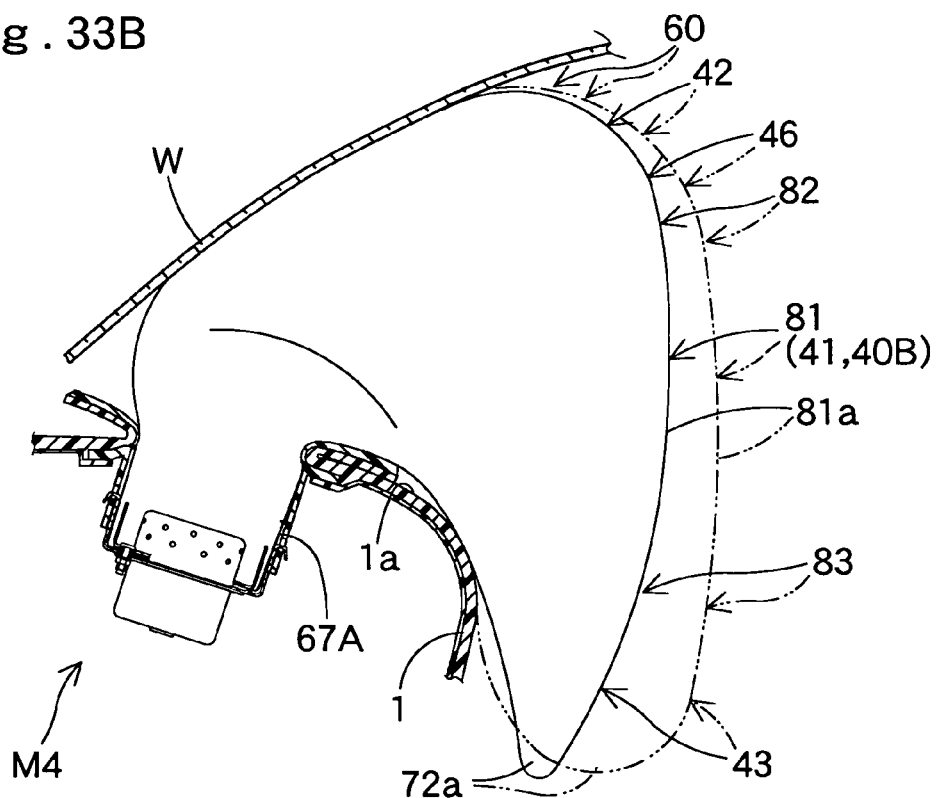
Figure 34:
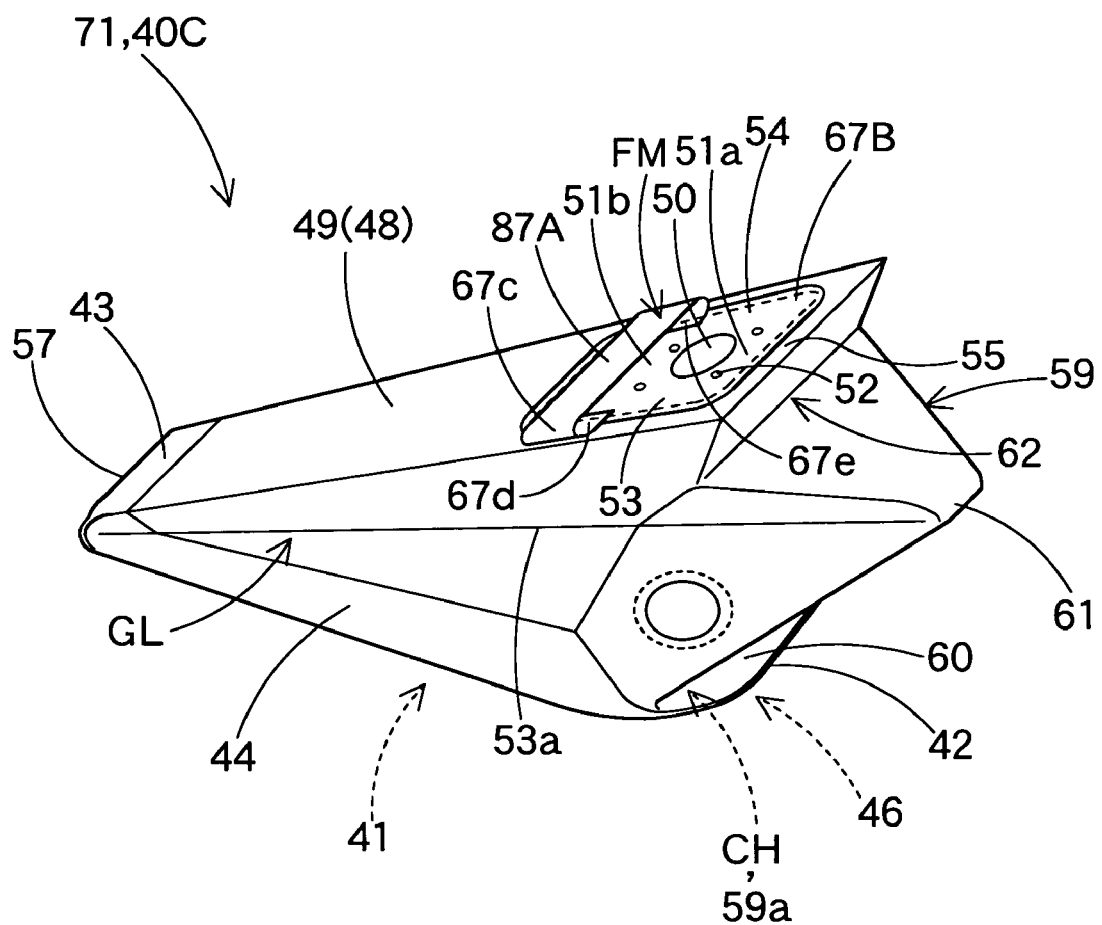
FIG. 34 is a perspective view of an airbag employed in a fifth embodiment of the airbag device in preparatorily folded state.

In the lower part 43 of the passenger's side wall 41, especially, the portion 74 folded back toward the inlet port 50 in the transverse folding step unfolds from the fold CF and is developed while contacting with surrounding members such as the wall portion 36b and the door 33B of the airbag cover 32, and the top face la of the dashboard 1, as indicated in order by solid lines of FIGS. 2, 19 and 20, solid lines and then double-dotted lines of FIGS. 21A and 21B, and double-dotted lines in FIG. 2. Accordingly, a face 81a confronting a passenger is prevented from projecting toward the passenger in a lower part 83. That is, the folded-back portion 74 of the airbag 40 or the lower part 43 of the passenger's sidewall 41 is prevented from popping out of the case 24, and while the folded-back portion 74 is held, an upper part 82 of a portion 81 of the airbag 40 projecting toward the passenger is charged with more inflation gas and more inflated than the lower part 83. Accordingly, the upper part 82 of the portion 81 of the airbag 40 is easily disposed generally right above the lower part 83 of the portion 81 of the airbag 40, which helps shift an entire area of the rear face 81a of the airbag rearward in a generally vertical condition.

Therefore, the airbag device M1 for front passenger's seat of the first embodiment shifts the entire rear face 81a of the deploying airbag 40 rearward in a generally vertical condition, and protects a passenger properly without applying partial pressure to the passenger even if the deploying airbag 40 engages the advancing passenger.

In the first embodiment, moreover, as shown in FIG. 16A, the leading end 72a of the folded-back portion 74 of the airbag 40 is located near the rear edge 51b of the gas inlet port 50. When mounted on the vehicle, this position falls within a range from the rear edge 51b of the gas inlet port 50 to the hinge line 34 of the door 33B of the airbag cover 32 in inner surface of a rear part of the case 24 (refer to FIG. 19).

Accordingly, when the folded-back portion 74 unfolds during deployment, a portion near the inlet port 50 in the lower wall 49 of the circumferential wall 48 in upper extension of the portion 74, i.e., a portion 73a near the inlet port 50 in the main portion 73 of the rear portion 72 in the preparatory airbag 71, is inflated and presses the folded-back portion 74 onto the side wall 29 of the case 24 or the wall potion 36b of the airbag cover 32, as shown in FIGS. 19 and 20, which delays development of the folded-back portion 74 even more, and helps shift the passenger's side wall 41 or the portion 81 rearward in a generally vertical condition.

Figure 18:
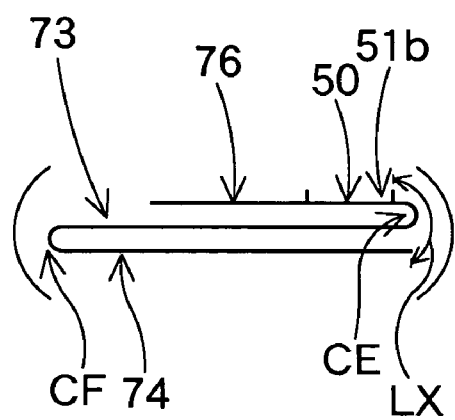
FIG. 18 illustrates a modification of transverse folding in the first embodiment.
Figure 18:
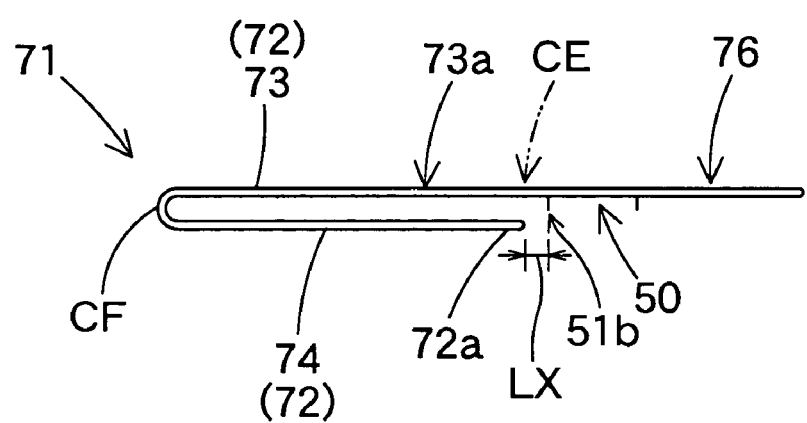

In the foregoing embodiment, the rear portion 72 of the preparatory airbag 71 is folded in two on fold CE as shown in FIG. 15B, in consideration of space-saving automated folding by a folding machine. However, as shown in FIG. 18, it will also be appreciated that the rear portion 72 is folded in two on fold CF such that the main portion 73 and the folded-back portion 74 overlap with each other without folding on fold CE, and then the transverse folding is applied to the rear portion 72.

In the foregoing embodiment, when forming the folded-back portion 74, the leading end (rear end) 72a of the rear portion 72 is located near the rear edge 51b of the gas inlet port 50. However, it is sufficient that the leading end 72a falls within a range from the rear edge 51b of the gas inlet port 50 to the hinge line 34 of the door 33B of the airbag cover 32 in inner surface of the rear part of the case 24 when mounted on the vehicle. This way the portion 73a near the inlet port 50 in the main portion 73 of the rear portion 72 in the preparatory airbag 71 presses the folded-back portion 74 onto the inner surface of the case 24 or the portion 36b of the airbag cover 32 during deployment of the airbag 40. That is, positioning of the leading end 72a of the folded-back portion 74 from the rear edge 51b of the inlet port 50 depends on a total distance L0 of a distance L1 along the bottom wall 25 of the case 24 (refer to FIGS. 3 and 19) from the rear edge 51b of the inlet port 50 to the rear side wall 29 of the case 24, and a distance L2 from a lower end of the side wall 29 to the hinge line 34 of the door 33B as the airbag device M1 is mounted on the vehicle. In other words, the positioning can be done by adjusting a distance LX (refer to FIG. 18) from the rear edge 51b to the leading end 72a as the folded-back portion 74 is overlaid on the main portion 73 within a range of L0.

In the first embodiment, moreover, a concavo-convex portion 32a as a resistance increasing means FM is disposed in portions on which the folded-back portion 74 slides during unfolding and developing, i.e., in the front side 36c of the wall portion 36b and in back surface 36a of the door 33B of the airbag cover 32 so that sliding resistance is increased in sliding. The resistance increasing means FM delays unfolding of the folded-back portion 74, and helps shift the passenger's side wall 41 or the portion 81 rearward in a generally vertical condition.

A second embodiment of the airbag device for front passenger's seat M2 according to the present invention includes a resistance increasing means FM as shown in FIGS. 22 to 25. This resistance increasing means FM includes a ceiling wall 32b whose hinge portion 34 of a door 33B of an airbag cover 32A is projected slightly forward than the airbag cover 32 in the first embodiment.

Although the second embodiment differs from the first embodiment in that the ceiling wall 32b as the resistance increasing means FM has the hinge portion 34 of the door 33B in a front end thereof, other constructions of the side wall 36 of the airbag cover 32A, the inflator 11, the case 24, the airbag 40 and so on of the second embodiment are the same as in the first embodiment. Descriptions of those same members will be omitted by giving them common reference numerals. Folding process of the airbag 40 and mounting process of the airbag device M2 are also the same as in the first embodiment, and therefore, those descriptions will be omitted.

In the airbag device M2, the airbag cover 32A includes the overhang ceiling wall 32b that is extended forward from an upper end of the wall portion 36b to the hinge portion 34 of the door 33B. Upon deployment of the airbag 40, accordingly, the folded-back portion 74 is caught by the overhang ceiling wall 32b and suppressed from smooth unfolding as shown in order in FIGS. 23, 24, 25A and 25B. Therefore, the passenger's side wall 41 or the portion 81 shifts rearward in a generally vertical condition.

The resistance increasing means FM achieves its goal if it is disposed either in portions on which the folded-back portion 74 slides during unfolding and development, or in the folded-back portion 74 itself. Accordingly, a third embodiment of the airbag device M3 shown in FIGS. 26 to 29 may be adopted.

In the third embodiment, the folded-back portion 74 of an airbag 40A is provided, in a portion to slide on the main portion 73, with a coating layer 85 of silicone rubber or the like for increasing friction resistance. This coating layer 85 serves as a resistance increasing means FM.

The third embodiment has the same constructions as the first embodiment in other parts of the airbag 40A, the inflator 11, the case 24, the airbag cover 32 and so on, except in that the airbag 40A includes the coating layer 85. Descriptions of those same members will therefore be omitted by giving them common reference numerals. Folding process of the airbag 40A and mounting process of the airbag device M3 are also the same as in the first embodiment, and therefore, those descriptions will be omitted.

The airbag device M3 for front passenger's seat includes the coating layer 85 as the resistance increasing means FM in the folded-back portion 74 of the airbag 40A. Upon deployment of the airbag 40A, accordingly, the folded-back portion 74 catches the main portion 73, and is suppressed from smooth unfolding as shown in order in FIGS. 27 to 29B. Therefore, the passenger's side wall 41 or the portion 81 shifts rearward in a generally vertical condition.

It will also be appreciated to adopt a fourth embodiment M4 of the present invention shown in FIGS. 30 to 33. In the fourth embodiment, the resistance increasing means FM for increasing sliding resistance is arranged in the main portion 73 which the folded-back portion 74 of an airbag 40B slides on. This resistance increasing means FM is constructed by arranging a reinforcing cloth 67A, which is applied in the periphery 51 of the gas inlet port 50, in outer side of the airbag 40B, and by forming slits 67a and 67B in the reinforcing cloth 67A, the slits extending transversely and juxtaposed in front-rear direction. Then a leading end 72a of the folded-back portion 74 is inserted into the slit 67a and then extracted from the slit 67b so that a belt portion 87 between the slits 67a and 67b holds the folded-back portion 74 onto the main portion 73.

The fourth embodiment, too, has the same constructions as the first embodiment in other parts of the airbag 40B, the inflator 11, the case 24, the airbag cover 32 and so on, except in that the airbag 40B includes the reinforcing cloth 67A with the slits 67a and 67b in outer side. Descriptions of those same members will therefore be omitted by giving them common reference numerals. With a process of inserting the leading end 72a of the folded-back portion 74 in and out of the slits 67a and 67b only added, folding process of the airbag 40B and mounting process of the airbag device M4 are also the same as in the first embodiment, and therefore, those descriptions will be omitted.

In the airbag device M4 for front passenger's seat, the main portion 73 of the airbag 40B includes the belt portion 87 to hold the folded-back portion 74 as the resistance increasing means FM. Upon deployment of the airbag 40B, accordingly, the folded-back portion 74 is subject to sliding resistance in going through the belt portion 87 in the reinforcing cloth 67A, and is suppressed from smooth unfolding as shown in order in FIGS. 31 to 33B. Therefore, the passenger's side wall 41 or the portion 81 shifts rearward in a generally vertical condition.

Figure 35:
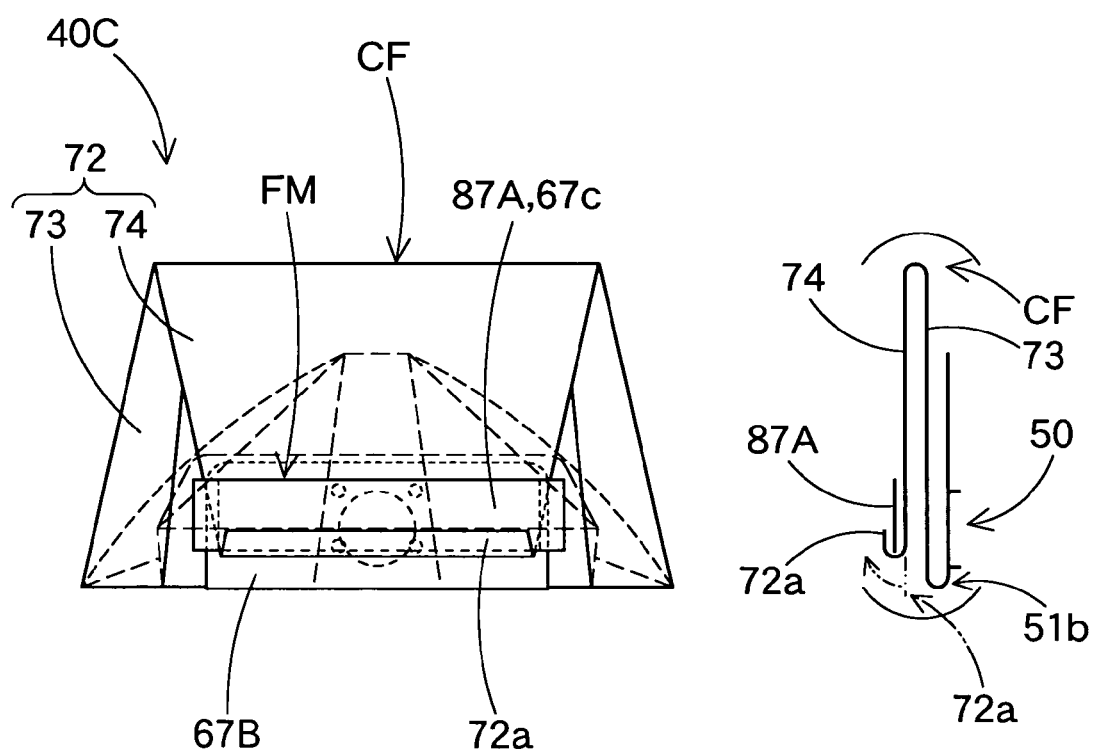
FIG. 35 illustrates a preparatorily folded airbag of FIG. 34, with a folded-back portion inserted in between a belt portion and a main portion.
Figure 36:
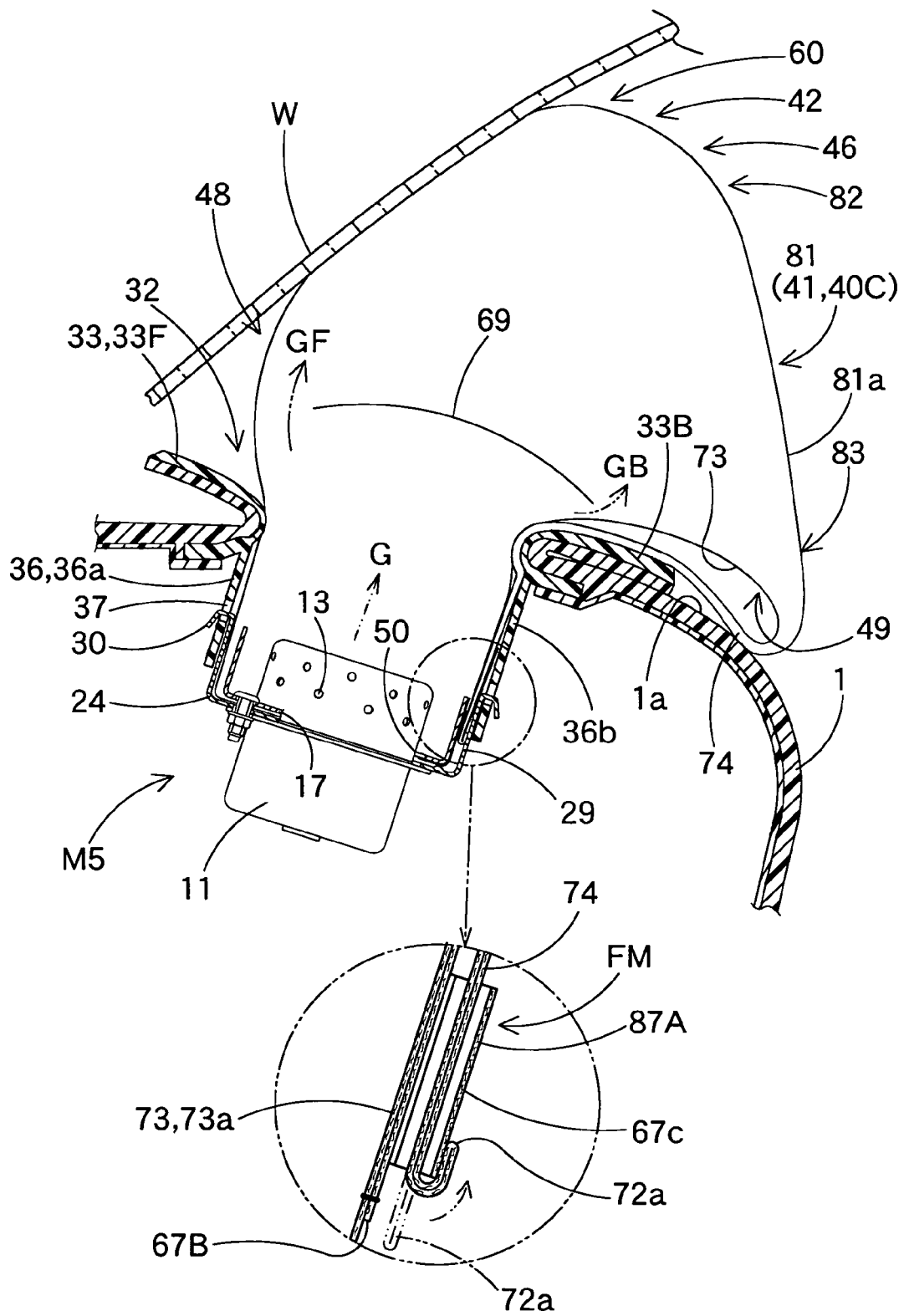
FIGS. 36, 37A, 37B and 37C illustrate the airbag device of FIG. 34 in service in order, from side of vehicle.
Figure 37A:
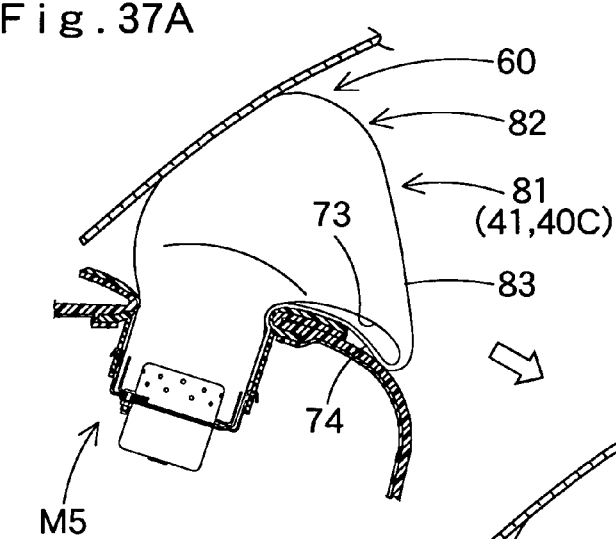
Figure 37B:
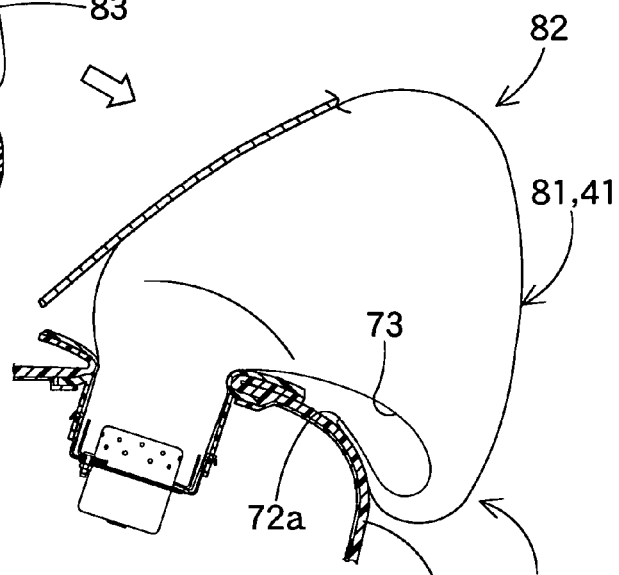
Figure 37C:
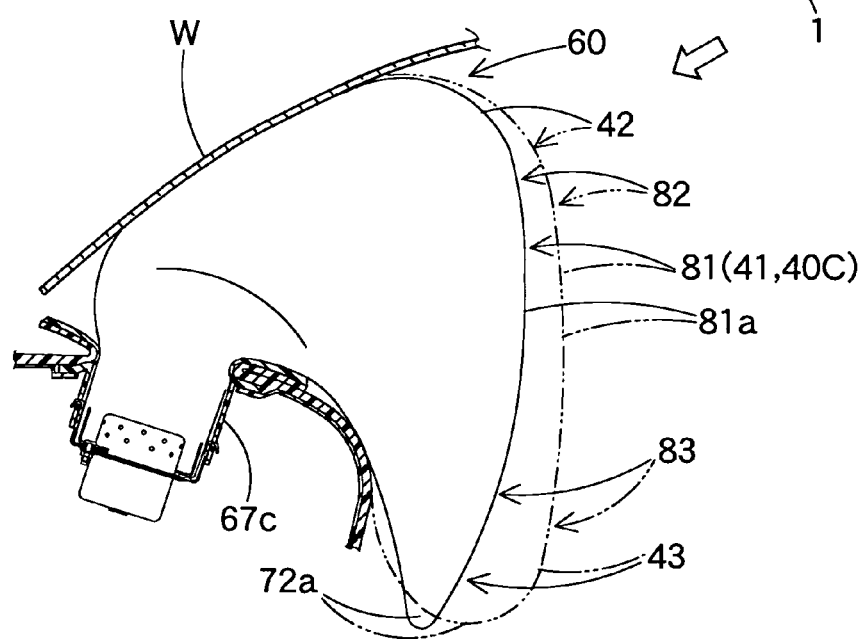

Without forming slits, the belt portion may be constructed by a belt-shaped member 67c extending from left and right edges of a reinforcing cloth 67B in a ring shape, as in an airbag 40C of a fifth embodiment of the airbag device M5 shown in FIGS. 34 to 37C. This belt portion 87A also holds the folded-back portion 74 as folded onto the main portion 73. The fifth embodiment, too, has the same constructions as the first embodiment in other parts of the airbag 40C, the inflator 11, the case 24, the airbag cover 32 and so on, except in that the airbag 40C includes the reinforcing cloth 67B with the belt-shaped member 67c serving as the belt portion 87A in outer side. Descriptions of the same members will therefore be omitted by giving them common reference numerals. With processes of inserting the leading end 72a of the folded-back portion 74 between the belt portion 87A and the reinforcing cloth 67B applied on a lower side of the lower wall 49 of the circumferential wall portion 48, and of folding back the leading end 72b over the belt portion 87A as shown in FIG. 35, only added, folding process of the airbag 40C and mounting process of the airbag device M5 are also the same as in the first embodiment, and therefore, the descriptions will be omitted.

In the airbag device M5 for front passenger's seat, the main portion 73 of the airbag 40C includes the belt portion 87A to hold the folded-back portion 74 as the resistance increasing means FM. Upon deployment of the airbag 40C, accordingly, the folded-back portion 74 is subject to sliding resistance in going through the belt portion 87A, and is suppressed from smooth unfolding as shown in order in FIGS. 36 to 37C. Therefore, the passenger's sidewall 41 or the portion 81 shifts rearward in a generally vertical condition.

In the fifth embodiment, moreover, since the leading end 72b of the folded-back portion 74 is folded back over the belt portion 87A, sliding resistance in going out of the belt portion 87A is further increased, which delays unfolding of the lower portion 83.

Figure 38:
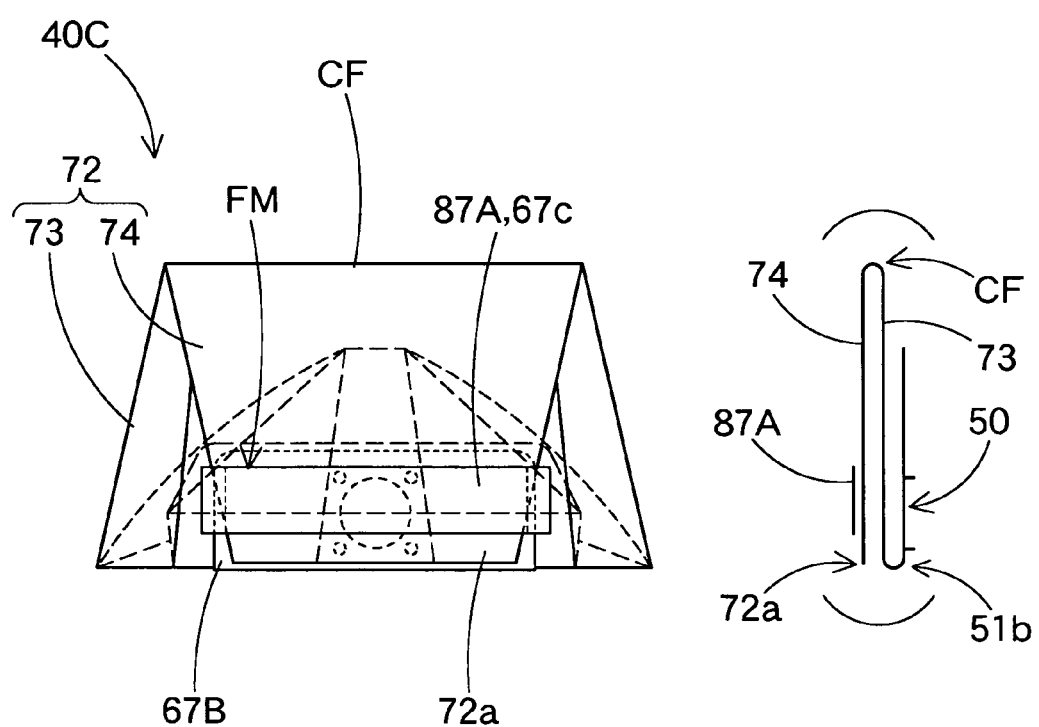
FIG. 38 illustrates a modification of the fifth embodiment, with a folded-back portion inserted in between a belt portion and a main portion.

Without considering above point, the folded-back portion 74 may be inserted between the main portion 73 and the belt portion 87A without being folded back at the leading end 72a, as shown in FIG. 38 or as indicated by double-dotted lines in a parenthesis of FIG. 35.

The belt portion 87A in the fifth embodiment composed of the belt-shaped member 67c, instead of the slits 67a and 67b, is joined to the lower side of the lower wall 49 of the circumferential wall 48 at left and right ends 67d and 67e folded toward transverse center with the reinforcing cloth 67B arranged between the ends 67d and 67e and the circumferential wall 48. With this construction, an opening into which the folded-back portion 74 is set in can be enlarged. Accordingly, even if transverse width of the folded-back portion 74 is great, the folded-back portion 74 is set in between the belt portion 87A and the main portion 73 or the reinforcing cloth 67B without causing longitudinal wrinkles by adjusting length of the belt-shaped member 67c. If wrinkles are not caused, the completely folded airbag 40C is prevented from becoming bulky.

In the preparatory airbag 71 in the airbags 40, 40A, 40B and 40C, the portion 60 to confront the gas inlet port 50 is located in the upper wall 59 of the circumferential wall 48. However, the preparatory folding may be so conducted such that a portion 46 of the passenger's side wall 41 near the upper edge 42 serve as the portion 60 to confront the inlet port 50.

Although the rear end grip portion 57 in the preparatory folding is a portion in the passenger's side wall 41 in the preferred embodiments, a portion in the lower wall 49 near the lower edge 43 of the passenger's side wall may be set as the grip portion. With this arrangement, a fold 59a in the upper circumferential wall 59 is located forward of the rear edge of the inlet port 50, so that the portion 46 of the passenger's side wall 41 becomes the portion 60 near the upper edge 42 to confront the inlet port 50.

What is claimed is:

1. An airbag device for front passenger seat of a vehicle, the airbag comprising:
    an airbag deployable up and rearward from top face of instrument panel for protecting a passenger when fed with inflation gas;
    a case for housing the folded airbag; and
    an airbag cover arranged in top face of the instrument panel, the airbag cover including a door pushed and opened by the airbag when the airbag deploys therefrom; wherein:
    the airbag includes a passenger's side wall and a circumferential wall extending from outer edge of the passenger's side wall;
    when the airbag is deployed, the passenger's side wall is arranged generally vertically to confront a passenger, and the circumferential wall narrows in a generally conical shape toward a front of the vehicle;
    the airbag includes a gas inlet port in a lower front part of the circumferential wall as deployed, the inlet port being arranged generally horizontally;
    the airbag is attached to the case at a periphery of the gas inlet port;
    when housed in the case and mounted on the vehicle, the airbag has preparatory folds that place the airbag in a preparatorily folded state and a regular folds, the regular folds include transverse folds to reduce a longitudinal dimension of the preparatorily folded airbag and longitudinal folds to reduce a transverse dimension of the preparatorily folded airbag;
    in the preparatorily folded state, an airbag portion near an upper edge of the passenger's side wall is located in a position to confront the gas inlet port, and the passenger's side wall is flatly developed to overlap with a lower part of the circumferential wall;
    the transverse folds are configured such that a portion of the preparatorily folded airbag located rearward of the gas inlet port is folded back toward a lower side of the lower part of the circumferential wall such that a rear end thereof is located closer to the gas inlet port, thus forming a folded-back portion, which overlaps with a remainder of the rear portion of the gas inlet port;
    the folded-back portion and the remainder of the rear portion of the gas inlet port are roll-folded on the circumferential wall from a fold on which the folded-back portion of folded and located over the vicinity of the gas inlet port;
    when housed in the case and mounted on a vehicle, a leading end of the folded-back portion is located within a range from the gas inlet port to a hinge portion of the door of the airbag cover in an inner surface of a rear part of the case; and
    when housed in the case and mounted on a vehicle, the leading end of the folded-back portion is located immediately above a portion of the rear portion most proximate to the gas inlet port and located at a lowermost position of the rear portion of the gas inlet port, except for the portion of the rear portion most proximate to the gas inlet port, and at a rearmost position of the rear portion.

2. The airbag device for front passenger's seat according to claim 1, wherein a resistance increasing means is arranged at least either in portions on which the folded-back portion slides during unfolding and development, or in the folded-back portion itself, whereby sliding resistance is increased when the folded-back portion slides on surrounding members.

3. The airbag device for front passengers seat according to claim 2, wherein the resistance increasing means is a concavo-convex portion arranged in portions of the airbag cover on which the folded-back portion slides.

4. The airbag device for front passenger's seat according to claim 2, wherein the resistance increasing means is a coating layer arranged in the folded-back portion for increasing friction resistance.

5. The airbag device for front passenger's seat according to claim 2, wherein the resistance increasing means is constituted by a belt portion formed in the vicinity of the gas inlet port for holding the folded-back portion onto a lower side of the lower part of the circumferential wall.

6. The airbag device for front passenger's seat according to claim 5, wherein a leading end of the folded-back portion is further folded back over the belt portion.

7. The airbag device for front passenger's seat according to claim 5, wherein:
   a reinforcing cloth is joined to a lower surface of the lower part of the circumferential wall, the reinforcing cloth including two slits into which the folded-back portion is inserted; and
   a portion between the two slits constitutes the belt portion.

8. The airbag device for front passenger's seat according to claim 5, wherein the belt portion is constructed by joining a belt-shaped member to a lower surface of the lower part of the circumferential wall with left and right ends of the member folded back toward transverse center.

9. The airbag device for front passenger's seat according to claim 2, wherein:
   the airbag cover includes:
      a door opening rearward around a hinge portion located in rear part thereof upon airbag deployment;
      a joint wall located around the door for attachment to the case; and
      a ceiling wall projected forward from a rear part of the joint wall, and having the hinge portion of the rear-opening door at front end thereof;
   whereby the ceiling wall constitutes the resistance increasing means.

10. The airbag device for front passenger's seat according to claim 1, wherein:
   in a preparatorily folded state,
   a generally entire area of the passenger's side wall is flatly developed while the circumferential portion is in a folded state;
   left and right portions of the gas inlet port in the circumferential wall are folded in on valley folds extending along front-rear direction such that generally intermediate portions between the gas inlet port and left and right edges of the flatly developed pasSenger's side wall are located closer to the gas inlet port and at side of the passenger's side wall in the gas inlet port periphery; and
   a portion of the circumferential wall near the upper edge of the passenger's side wall is folded in on a valley fold extending in a transverse direction.

* * * * *